United States Patent
Jeffs

(10) Patent No.: US 8,707,361 B2
(45) Date of Patent: Apr. 22, 2014

(54) METHOD AND SYSTEM FOR QUICKLY RECORDING LINEAR CONTENT FROM AN INTERACTIVE INTERFACE

(75) Inventor: Alistair E Jeffs, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 565 days.

(21) Appl. No.: 11/871,986

(22) Filed: Oct. 13, 2007

(65) Prior Publication Data

US 2009/0100065 A1 Apr. 16, 2009

(51) Int. Cl.
*G06F 3/00* (2006.01)
*G06F 13/00* (2006.01)
*H04N 5/445* (2011.01)

(52) U.S. Cl.
USPC .......... 725/43; 725/53; 725/58; 725/25; 725/118; 725/133; 725/141; 725/148; 725/153

(58) Field of Classification Search
None
See application file for complete search history.

(56) References Cited

U.S. PATENT DOCUMENTS

| | | | |
|---|---|---|---|
| 5,920,700 A | 7/1999 | Gordon et al. | |
| 6,005,565 A * | 12/1999 | Legall et al. | 715/721 |
| 6,057,890 A | 5/2000 | Virden et al. | |
| 6,199,049 B1 | 3/2001 | Conde et al. | |
| 6,301,618 B1 | 10/2001 | Sitaraman et al. | |
| 6,515,680 B1 | 2/2003 | Hendricks et al. | |
| 6,564,996 B2 | 5/2003 | Hoffman et al. | |
| 6,643,620 B1 | 11/2003 | Contolini et al. | |
| 6,658,661 B1 | 12/2003 | Arsenault et al. | |
| 6,681,395 B1 | 1/2004 | Nishi | |
| 6,714,722 B1 | 3/2004 | Tsukidate | |
| 6,813,711 B1 | 11/2004 | Dimenstein | |
| 6,922,845 B2 | 7/2005 | Yap et al. | |
| 6,968,364 B1 | 11/2005 | Wong et al. | |
| 7,027,716 B1 | 4/2006 | Boyle et al. | |
| 7,036,142 B1 | 4/2006 | Zhang et al. | |
| 7,047,196 B2 | 5/2006 | Calderone et al. | |
| 7,281,261 B2 | 10/2007 | Jaff et al. | |
| 7,373,652 B1 | 5/2008 | Bayrakeri et al. | |
| 7,600,064 B2 | 10/2009 | Knowles et al. | |
| 7,624,429 B2 | 11/2009 | Van Ackere et al. | |
| 7,636,300 B2 | 12/2009 | Scott et al. | |
| 7,917,130 B1 | 3/2011 | Christensen et al. | |
| 2002/0031097 A1 | 3/2002 | Jung | |
| 2002/0044225 A1 | 4/2002 | Rakib | |
| 2002/0046407 A1 | 4/2002 | Franco | |
| 2002/0107802 A1 | 8/2002 | Philips | |
| 2002/0143976 A1 | 10/2002 | Barker et al. | |
| 2002/0150387 A1 * | 10/2002 | Kunii et al. | 386/83 |
| 2002/0151327 A1 | 10/2002 | Levitt | |

(Continued)

FOREIGN PATENT DOCUMENTS

| | | |
|---|---|---|
| EP | 0691787 A1 | 1/1996 |
| JP | 2003319271 | 11/2003 |

(Continued)

*Primary Examiner* — Jason J Chung

(57) ABSTRACT

A method and system includes a first device having an ordering interface and forming a recording command comprising a linear channel, a start time, time duration and date. The first device communicates a customer identifier and the recording command to a content processing system corresponding to the linear content. The content processing system forms a control word from the recording command and communicates the control word to a user device. The user device receives the content corresponding to the recording command in response to the control word.

21 Claims, 32 Drawing Sheets

(56) References Cited

U.S. PATENT DOCUMENTS

| | | | |
|---|---|---|---|
| 2003/0005435 A1 | 1/2003 | Nelger et al. | |
| 2003/0005446 A1 | 1/2003 | Jaff et al. | |
| 2003/0009758 A1 | 1/2003 | Townsend et al. | |
| 2003/0023504 A1 | 1/2003 | Berenson et al. | |
| 2003/0030751 A1 | 2/2003 | Lupulescu et al. | |
| 2003/0061039 A1 | 3/2003 | Levin | |
| 2003/0084449 A1 | 5/2003 | Chane et al. | |
| 2003/0095791 A1* | 5/2003 | Barton et al. | 386/83 |
| 2003/0101456 A1 | 5/2003 | Park et al. | |
| 2003/0193519 A1 | 10/2003 | Hayes et al. | |
| 2003/0206719 A1 | 11/2003 | Bumgardner et al. | |
| 2003/0208763 A1 | 11/2003 | McElhatten et al. | |
| 2003/0221127 A1 | 11/2003 | Risan et al. | |
| 2003/0221194 A1 | 11/2003 | Thiagarajan et al. | |
| 2004/0015989 A1 | 1/2004 | Kaizu et al. | |
| 2004/0025185 A1 | 2/2004 | Goci et al. | |
| 2004/0040041 A1* | 2/2004 | Crawford | 725/88 |
| 2004/0047599 A1* | 3/2004 | Grzeczkowski | 386/83 |
| 2004/0117831 A1 | 6/2004 | Ellis et al. | |
| 2004/0148638 A1 | 7/2004 | Weisman et al. | |
| 2004/0177376 A1 | 9/2004 | Caspi et al. | |
| 2004/0237100 A1 | 11/2004 | Pinder et al. | |
| 2004/0261136 A1 | 12/2004 | Aratani et al. | |
| 2004/0268410 A1 | 12/2004 | Barton et al. | |
| 2005/0014463 A1 | 1/2005 | Shin | |
| 2005/0021609 A1 | 1/2005 | Houghton et al. | |
| 2005/0028208 A1* | 2/2005 | Ellis et al. | 725/58 |
| 2005/0031099 A1 | 2/2005 | Iggulden et al. | |
| 2005/0055716 A1 | 3/2005 | Louie et al. | |
| 2005/0108769 A1* | 5/2005 | Arnold et al. | 725/115 |
| 2005/0138654 A1* | 6/2005 | Minne | 725/31 |
| 2005/0144634 A1 | 6/2005 | Koo et al. | |
| 2005/0144646 A1 | 6/2005 | Lecrom et al. | |
| 2005/0160458 A1 | 7/2005 | Baumgartner | |
| 2005/0165784 A1 | 7/2005 | Gomez et al. | |
| 2005/0177853 A1 | 8/2005 | Williams et al. | |
| 2005/0193425 A1 | 9/2005 | Sull et al. | |
| 2005/0216933 A1 | 9/2005 | Black | |
| 2005/0229212 A1* | 10/2005 | Kuether et al. | 725/58 |
| 2005/0240968 A1* | 10/2005 | Knudson et al. | 725/58 |
| 2005/0251558 A1 | 11/2005 | Zaki | |
| 2005/0262537 A1 | 11/2005 | Baran et al. | |
| 2005/0278760 A1 | 12/2005 | Dewar et al. | |
| 2006/0031833 A1* | 2/2006 | Huang et al. | 717/178 |
| 2006/0031883 A1 | 2/2006 | Ellis et al. | |
| 2006/0037048 A1 | 2/2006 | DeYonker et al. | |
| 2006/0041910 A1 | 2/2006 | Hatanaka et al. | |
| 2006/0041926 A1 | 2/2006 | Istvan et al. | |
| 2006/0075429 A1 | 4/2006 | Istvan et al. | |
| 2006/0101496 A1 | 5/2006 | Syed | |
| 2006/0107285 A1* | 5/2006 | Medvinsky | 725/25 |
| 2006/0156372 A1 | 7/2006 | Cansler et al. | |
| 2006/0171390 A1 | 8/2006 | La Joie | |
| 2006/0190963 A1* | 8/2006 | Wagner et al. | 725/40 |
| 2006/0195441 A1 | 8/2006 | Julia et al. | |
| 2006/0257123 A1 | 11/2006 | Horozov et al. | |
| 2006/0271950 A1 | 11/2006 | Kim et al. | |
| 2006/0271973 A1 | 11/2006 | Jerding et al. | |
| 2006/0287916 A1 | 12/2006 | Starr et al. | |
| 2007/0061336 A1 | 3/2007 | Ramer et al. | |
| 2007/0094689 A1 | 4/2007 | McElhatten et al. | |
| 2007/0107016 A1* | 5/2007 | Angel et al. | 725/61 |
| 2007/0118857 A1 | 5/2007 | Chen et al. | |
| 2007/0136486 A1 | 6/2007 | Al Amri | |
| 2007/0143783 A1 | 6/2007 | Wagner et al. | |
| 2007/0157281 A1 | 7/2007 | Ellis et al. | |
| 2007/0174888 A1 | 7/2007 | Rubinstein | |
| 2008/0066135 A1 | 3/2008 | Brodersen et al. | |
| 2008/0075285 A1 | 3/2008 | Poli et al. | |
| 2008/0077506 A1 | 3/2008 | Rampell et al. | |
| 2008/0109306 A1 | 5/2008 | Maigret et al. | |
| 2008/0155600 A1 | 6/2008 | Klappert et al. | |
| 2008/0155607 A1* | 6/2008 | Klappert | 725/58 |
| 2008/0195664 A1 | 8/2008 | Maharajh et al. | |
| 2008/0242221 A1 | 10/2008 | Shapiro et al. | |
| 2008/0256084 A1 | 10/2008 | Kahn et al. | |
| 2008/0263600 A1* | 10/2008 | Olague et al. | 725/58 |
| 2008/0276284 A1* | 11/2008 | Bumgardner et al. | 725/58 |
| 2009/0013034 A1 | 1/2009 | Cheng et al. | |
| 2009/0028331 A1 | 1/2009 | Millar et al. | |
| 2009/0199230 A1 | 8/2009 | Kumar et al. | |
| 2010/0063877 A1 | 3/2010 | Soroca et al. | |

FOREIGN PATENT DOCUMENTS

| | | |
|---|---|---|
| JP | 2004080194 | 3/2004 |
| WO | 92/11713 A1 | 7/1992 |
| WO | 2005081523 A1 | 9/2005 |
| WO | 2007086941 A1 | 8/2007 |
| WO | 2007132165 A1 | 11/2007 |

* cited by examiner

FIG. 11

Search Results

Found 80 results matching: "Something searched for" in Broadband Video, Results sorted by relevance.

Program Guide

| Search | | Broadband Titles ▼ | All Fields ▼ | Search |
|---|---|---|---|---|
| TV Movies | | Found 20 Results | | See all results >> |
| Movies | | Found 20 Results | | See all results >> |
| Pay Per View | | Found 20 Results | | See all results >> |
| ○ Broadband Video | | | | Showing 1-10 of 20 |

>> Back   1  2   Next >>

| Title | | End Date ➜ | Price |
|---|---|---|---|
| 01 Home Alone | ⓘ ⊕ | Mon.Nov.20 | FREE w/sub. |
| 02 Jag ADT | ⓘ ⊕ | Tue.Nov.21 | $2.99 |
| 03 Year Old Virgin | ⓘ ⊕ | Wed.Nov.22 | FREE w/sub. |
| 04 Cheaper By The Dozen 2 | ⓘ ⊕ | Thu.Nov.23 | $3.99 |
| 05 Home Alone | ⓘ ⊕ | Mon.Nov.20 | FREE w/sub. |
| 06 Jag ADT | ⓘ ⊕ | Tue.Nov.21 | $2.99 |
| 07 Year Old Virgin | ⓘ ⊕ | d.Nov.22 | FREE w/sub. |
| 08 Cheaper By The Dozen 2 | ⓘ ⊕ | Thu.Nov.23 | $3.99 |
| 09 Year Old Virgin | ⓘ ⊕ | Wed.Nov.22 | FREE w/sub. |
| 10 Cheaper By The Dozen 2 | ⓘ ⊕ | Thu.Nov.23 | $3.99 |

>> Back   1  2   Next >>

<< Return to Broadband Listings

FIG. 14

| Customer Title | Queue Status |
|---|---|
| Title Q | Downloading |
| Title R | |
| Title S | |
| Title T | Unavailable |

METHOD AND SYSTEM FOR QUICKLY RECORDING LINEAR CONTENT FROM AN INTERACTIVE INTERFACE

TECHNICAL FIELD

The present disclosure relates to a content processing and delivery system and, more specifically, to a system for ordering content from an interactive interface of a mobile device in response thereto.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resources.

Content providers are increasingly trying to determine additional ways to provide content to users. Often times, a user may not be located where the recording device associated with their television is located. Therefore, opportunities for recording content may be missed.

SUMMARY

The present disclosure allows users to order content from an interactive interface provided through a mobile device. The content is then transferred to and recorded at a user device. The teachings herein may be provided for live content and on-demand content stored within a content processing system.

In one aspect of the disclosure, a method of ordering content includes accessing an ordering interactive interface, forming a recording command comprising a linear channel, a start time, a time duration and date, communicating a customer identifier and recording command to a content processing system corresponding to the linear content, forming a control word from the recording command, communicating the control word to a user device and receiving the content corresponding to the recording command at the user device in response to the control word.

In a further aspect of the disclosure, a system includes a first device having an ordering interface and forming a recording command comprising a linear channel, a start time, time duration and date. The first device communicates a customer identifier and the recording command to a content processing system corresponding to the linear content. The content processing system forms a control word from the recording command and communicates the control word to a user device. The user device receives the content corresponding to the recording command in response to the control word.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 11 is a web page for browsing various video-on-demand titles.

FIG. 14 is a screen display of a search results page.

FIG. 17 is a tabular view of a customer queue.

DETAILED DESCRIPTION

Figure 1:
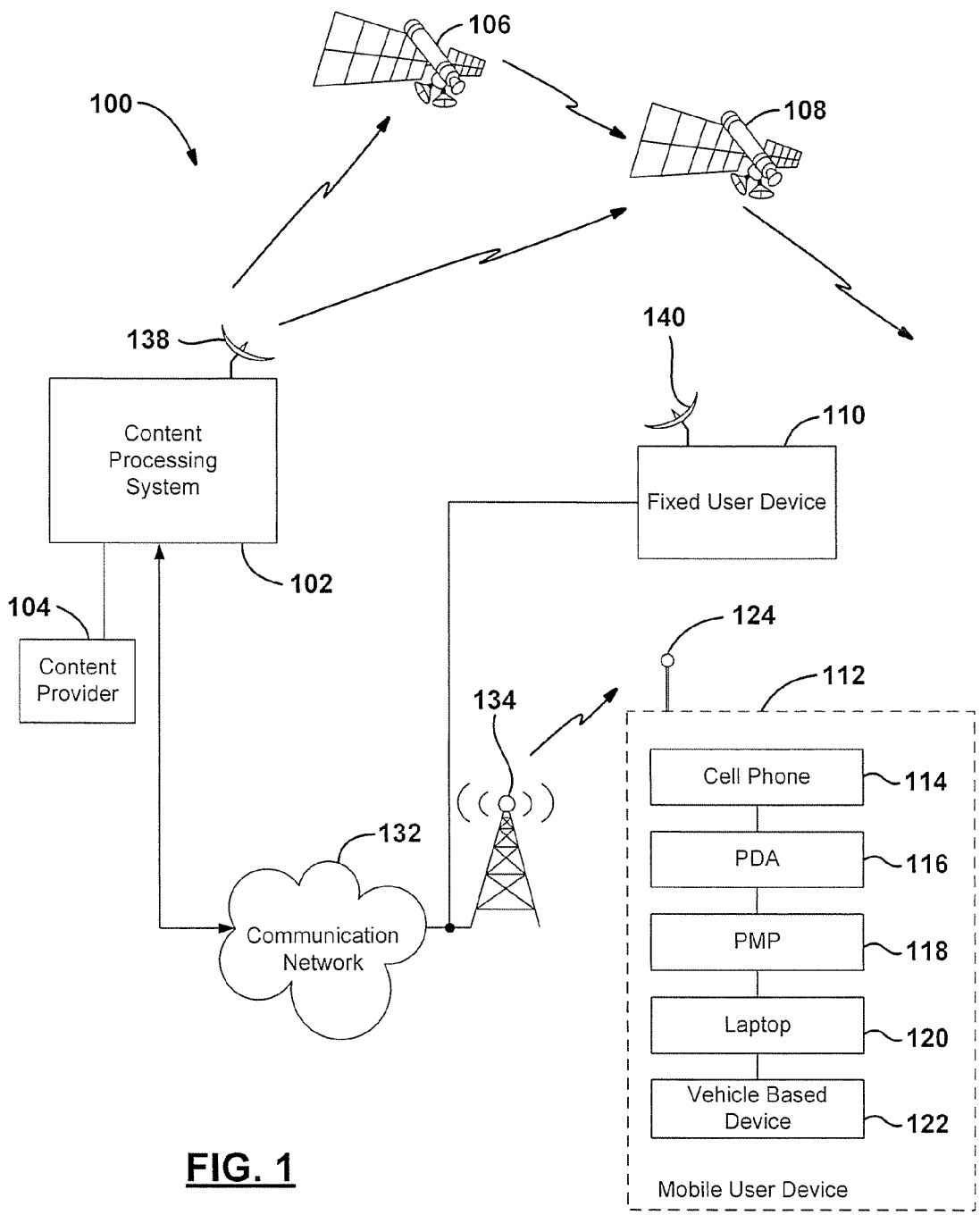
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system and a broadband system. The broadband distribution system may be implemented in a terrestrial system such as cable or telephone-type system. An optical fiber may also be used in the broadband system. Wireless distribution may also be used in the broadband distribution system.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Referring now to FIG. 1, a communication system 100 includes a content processing system 102 that is used as a processing and transmission source, a plurality of content providers, one of which is shown at reference numeral 104 and a first satellite 106. A second satellite 108 may also be incorporated into the system. The satellites 106, 108 may be used to communicate different types of information or different portions of various contents from the content processing system 102. The system 100 also includes a plurality of fixed user devices 110 such as integrated receiver/decoders (IRDs) or set-top box. Wireless communications are exchanged between the content processing system 102 and the fixed user devices 110 through one or more of the satellites 106, 108. The wireless communications may take place at any suitable frequency, such as, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 106, 108, various types of information such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Information or content provided to content processing system 102 from the media source 104 may be transmitted, for example, via an uplink antenna 138 to the satellite(s) 106, 108, one or more of which may be a geosynchronous or geostationary satellite, that, in turn, rebroadcast the information over broad geographical areas on the earth that include the user devices 110, 112. The satellites may have inter-satellite links as well. Among other things, the example content processing system 102 of FIG. 1 provides program material to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. To receive the information rebroadcast by satellites 106, 108, each for user device 110 is communicatively coupled to a receiver or downlink antenna 140.

Security of assets broadcast via the satellites 106, 108 may be established by applying encryption and decryption to assets or content during content processing and/or during broadcast (i.e., broadcast encryption). For example, an asset can be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the IRD 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
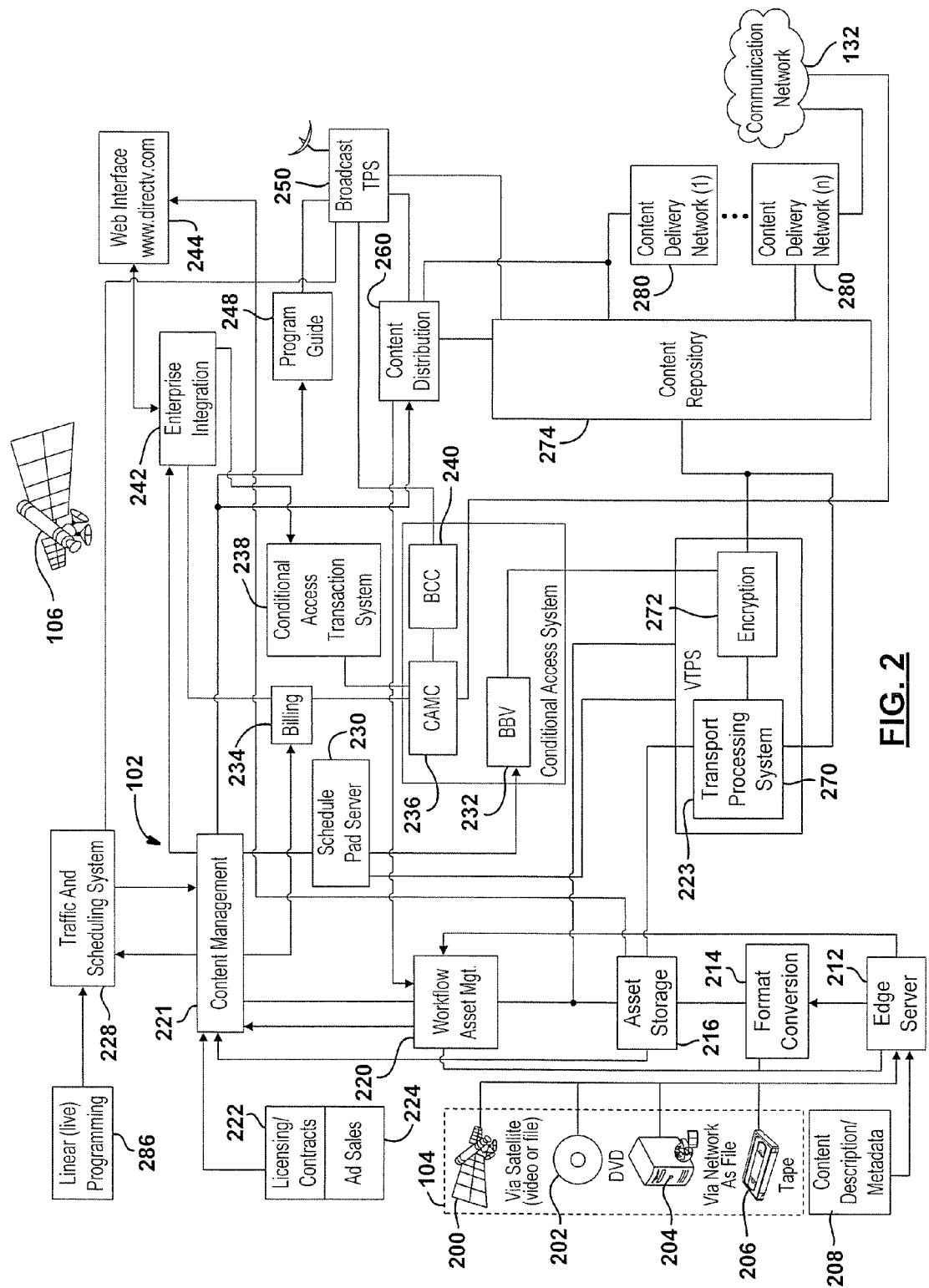
FIG. 2 is a detailed block diagrammatic view of the content processing system of FIG. 2.

Referring now to FIG. 2, the content processing system 102 of FIG. 1 is illustrated in further detail. The content provider 104 may include various types of content providers, including those that provide content by way of a satellite 200, DVD 202, via a network as a file in 204, by way of tapes and other means. The content provider 104 may also provide graphics, content description, and other metadata 208 to the system.

The content providers 104 may be various types of content providers and provide various types of content including advertising content such as row advertising (ads). The content providers may provide various types of information including advertising information. Advertising providers may provide information on various products or various available or future content. It should be noted that the advertising provider and the content provider may be one in the same.

Content providers may also have a home page within the present system. Briefly, the home page is a portion of the program guide for selecting content to be downloaded to the user device. The system operator may also have its own home page that has various categories of content. The categories and types of home pages will be described below. The home page provides a listing of on-demand content for the particular subscriber.

The home page may be formed in various configurations including a menu structure. The content providers may also provide various metadata for the menu structure or program guide.

Another area of the content processing system 102 is an input server 212 that receives the various content and converts the format in a format conversion system 214. A house format asset storage server 216 may be used to store the content asset in a house format. Still image files, trailers, and other information may also be stored in the house format asset storage server. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The VTPS 223 may encode the packet. The encoder may encode the data according to the CableLabs® Video-on-Demand (VoD) encoding specification MD-SP-VOD-CEP-101-040107 (i.e., performs asset encoding). The encoded data is then packetized into a stream of data packets by a packetizer 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102. The content management 221 may also assign material identifications to the various received content. The material identification may utilize the asset identifier (ID) in the metadata as well as the provider ID. Content, posters and other received information may be assigned related material identifications to make them easier to associate and retrieve. For example, different suffixes may be used to identify related content with the remainder of the material identification being the same.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

A traffic and scheduling system 228 is used to provide the requested channel, program associated data (PAD), channel information and program information packets (PIPs). The traffic and scheduling system 228 may schedule content processing for a plurality of received assets based on a desired program lineup to be offered by the communication system 100. This may include both on-demand programming and linear programming 286. For example, a live TV program for which a high demand for reruns might be expected could be assigned a high priority for content processing. The linear programming 786 provides live broadcasts through the satellite.

A schedule PAD server (SPS) 230 may be coupled to the workflow system and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2, users of the user devices 110 are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives cellback information from the communication network 132. The conditional access system may be used to generate authorizations, pay-per-view billing data, and callback data from the billing system 234. Record requests may also be provided from the conditional access transaction system 238. A conditional access system BCC 240 may be used to generate a conditional access packet from the information from the conditional access system 236.

The billing system 234 may generate purchase data that is provided to the enterprise integration (EI) block 242. The enterprise integration block 242 may generate record requests to the conditional access transaction system 238. Record requests may be generated through a web interface such as DIRECTV.com® in block 244. Various ordering information, such as ordering broadband (on-demand) video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Titles, description, various categories and metadata from the content management system 221 may be provided to the advanced program guide system 248. The program guide system 248 may be coupled to a satellite broadcasting system such as a broadcast transport processing system 250 that broadcasts linear and on-demand content to the users through the satellite 106, 108.

The program guide data generated by the program guide system 248 may include information that is used to generate a display of guide information to the user, wherein the program guide may be a grid guide and informs the user of particular programs that are broadcast on particular channels at particular times. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs.

Titles, descriptions and categories may also be provided from the content management system 221 to the content distribution system 260. Content files and metadata may be controlled by the content distribution system 260.

Referring back to the video transport processing system 227, the video transport processing system 223 includes a transport packaging system 270. The transport packaging system 270 creates pre-packetized unencrypted files that are stored in the content repository 274. An encryption module 272 receives the output of the transport packaging system and encrypts the packets. Fully packaged and encrypted files may also be stored in the content repository 274. Encryption may take place in the data portion of a packet and not the header portion.

One or more content delivery networks 280a-n may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250.

The communication network 132 may be the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hypertext transfer protocol (HTTP), etc. Each file received by the user device may be checked for completeness and integrity and if a file is not intact, missing, and/or damaged portions of the files may be delivered or downloaded again. Alternatively, the entire file may be purged from the IRD and delivered or downloaded again.

Security of assets available by way of the content delivery network may also be established. Control word packets for each broadcast-encrypted asset or content file may be provided to the content delivery network. Encryption may also be provided.

The broadcast transport processing system 250 may provide various functions, including encoding, packetizing, encrypting, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, program guide information or assets asset files, menus structures etc.) and/or live (linear) content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though the at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2 are discussed in detail below.

Figure 3:
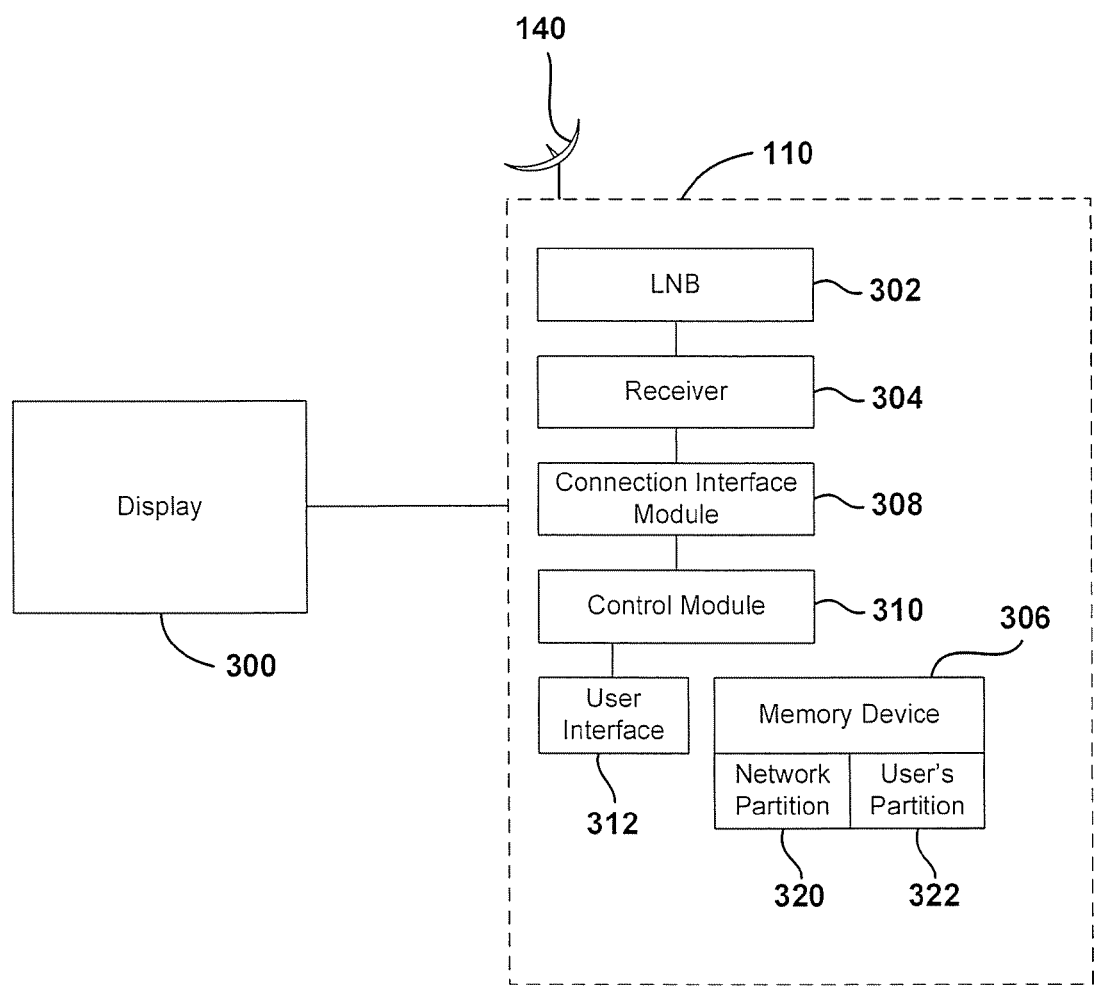
FIG. 3 is a detailed block diagrammatic view of the fixed user device of FIG. 1.

Referring now to FIG. 3, the user device 110 may be one of any variety of devices, for example, a set-top box, a home media server, a home media center (HMC), a personal computer (PC) having a receiver card installed therein, etc. A display device 300 such as a television set, a computer monitor, a portable media player or the like may be coupled to the user device. The user device 110 may be an integrated receiver decoder, a satellite television receiver or the like for displaying and/or playback of received programming.

The receive antenna 140 (124 on a mobile device) receives signals conveying a modulated multiplexed bitstream from the satellites 106, 108. Within the receive antenna 140, the signals are coupled from a reflector and feed to a low-noise block (LNB) 302, which amplifies and frequency downconverts the received signals. The LNB 302 output is then provided to a receiver 304, which receives, demodulates, depacketizes, demultiplexes, decrypts and decodes the received signal to provide audio and video signals to the display device 300 or a memory device 306, or both. The memory device 306 may be implemented separately from or within the user device 110. The receiver 304 is responsive to user inputs to, for example, tune to a particular program.

To store received and/or recorded programs and/or assets, the memory device 306 may include any of a variety of or combination of storage devices such as a hard disk drive, DVR, flash memory or other types of memory devices. The memory device 306 may be used to store the content, information, metadata, program guide objects and information and/or programs received via the satellites 106, 108 and/or the CDN 280. In particular, the packets stored on memory device 306 may be the same encoded and, optionally, encrypted packets created by the content processing system 102 and transmitted via the satellites 106, 108 and/or made available for download via the CDN 280.

The memory device 306 may also be a device capable of recording information on, for instance, analog media such as videotape or computer readable digital media such as a hard disk drive (HDD), a digital versatile disc (DVD), a compact disc (CD) and/or any other suitable media.

To communicate with any of a variety of clients, media players, etc., the illustrated example the user device 110 includes one or more connection interface modules 308 (e.g., USB, serial port, Firewire, etc.). The connection interface module 306 may act as a network interface that implements, for example, an Ethernet interface.

Each user device 110 may connect to the communication network such as the Internet 122 via any of a variety of technologies, for instance, a voice-band and/or integrated services digital network (ISDN) modem connected to a conventional PSTN, a wireless broadband connection (e.g., IEEE 802.11b, 802.11g, WiMax etc.), a broadband wired connection (e.g., ADSL, cable modems, etc.), a wired Ethernet connection (e.g., local area network (LAN), wide area network (WAN), etc.), a cellular connection a leased transmission facility (e.g., a digital signal level 1 circuit (a.k.a. a DS1), a fractional-DS1, etc.), etc.

The user device 110 may also include a control module 310 that is used to control the operation of the various components within the user device.

A user interface 312 may, for example, be a set of push buttons or a remote control interface. The user interface 312 is used to make selections, input various data, and change the parameters of the user device 110. The user interface 312 may be used together with a graphical user interface displayed on the display device associated with the user device.

It should also be noted that the user devices 114 (device 110) may be configured in a similar manner to those illustrated in FIG. 3 through reference number 110. Such devices may include an internal antenna rather than an external dish-type antenna that is illustrated in the fixed device as 140. Also, external antennas are possible such as a phased array antenna.

The recording device 306 may also be partitioned into a network partition 320 and a user partition 322. Different types of content or assets may be stored in the network partition 320 or the user partition 322. The content stored in the different partitions may relate to the tier of the content. This will be further described below.

Figure 4:
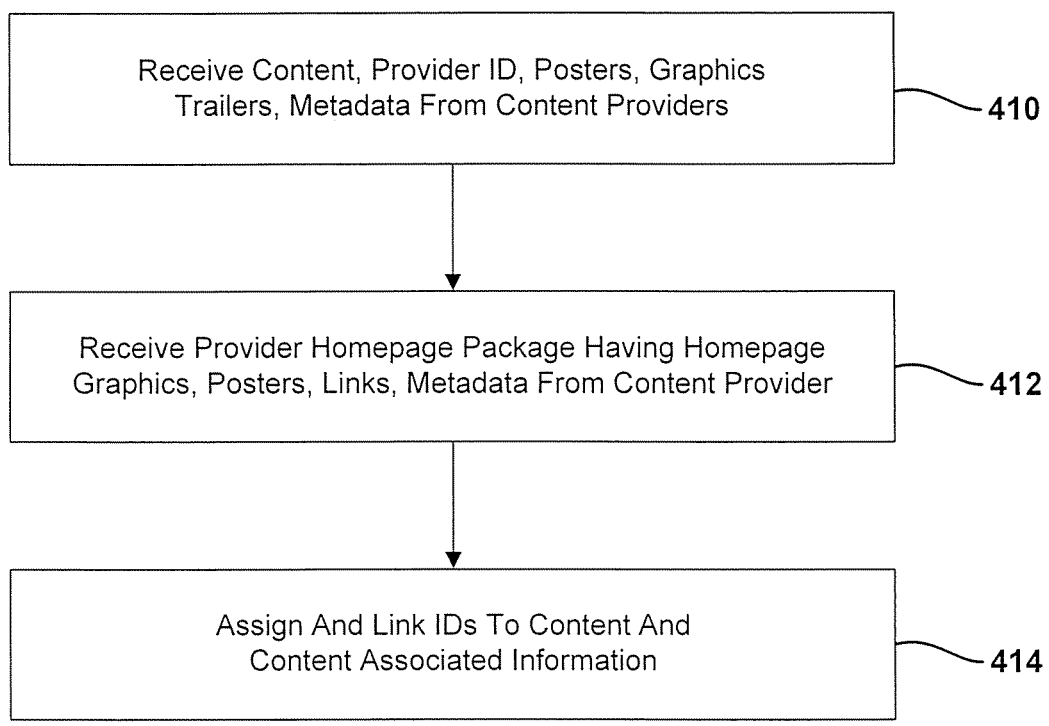
FIG. 4 is a flowchart illustrating a method for linking content and content-associated information.

Referring now to FIG. 4, a method of assigning material identifications to various content and content-associated information is set forth. In step 410, content is received from various content providers. The providers may provide a provider or asset identification (ID) for the content provided. Posters, trailers, graphics, metadata may also be received from content providers. The content and the other content-associated information may be received in different ways or the same way. When received in different ways, they may be associated together in the content processing system. In step 412, the content providers may also provide a home page package having the home page graphics, posters, links and metadata from the content provider. The types of metadata that may be received from the content providers was described above in FIG. 1.

In step 414, the material identification is assigned to the content and to the content-associated information. This step may be performed in the content management system of FIG. 2. Preferably the material ID and the associated content information are linked together. As mentioned above, one way to link the content with the content-associated information is to provide a common material identification with various suffixes to identify the various information.

Figure 5:
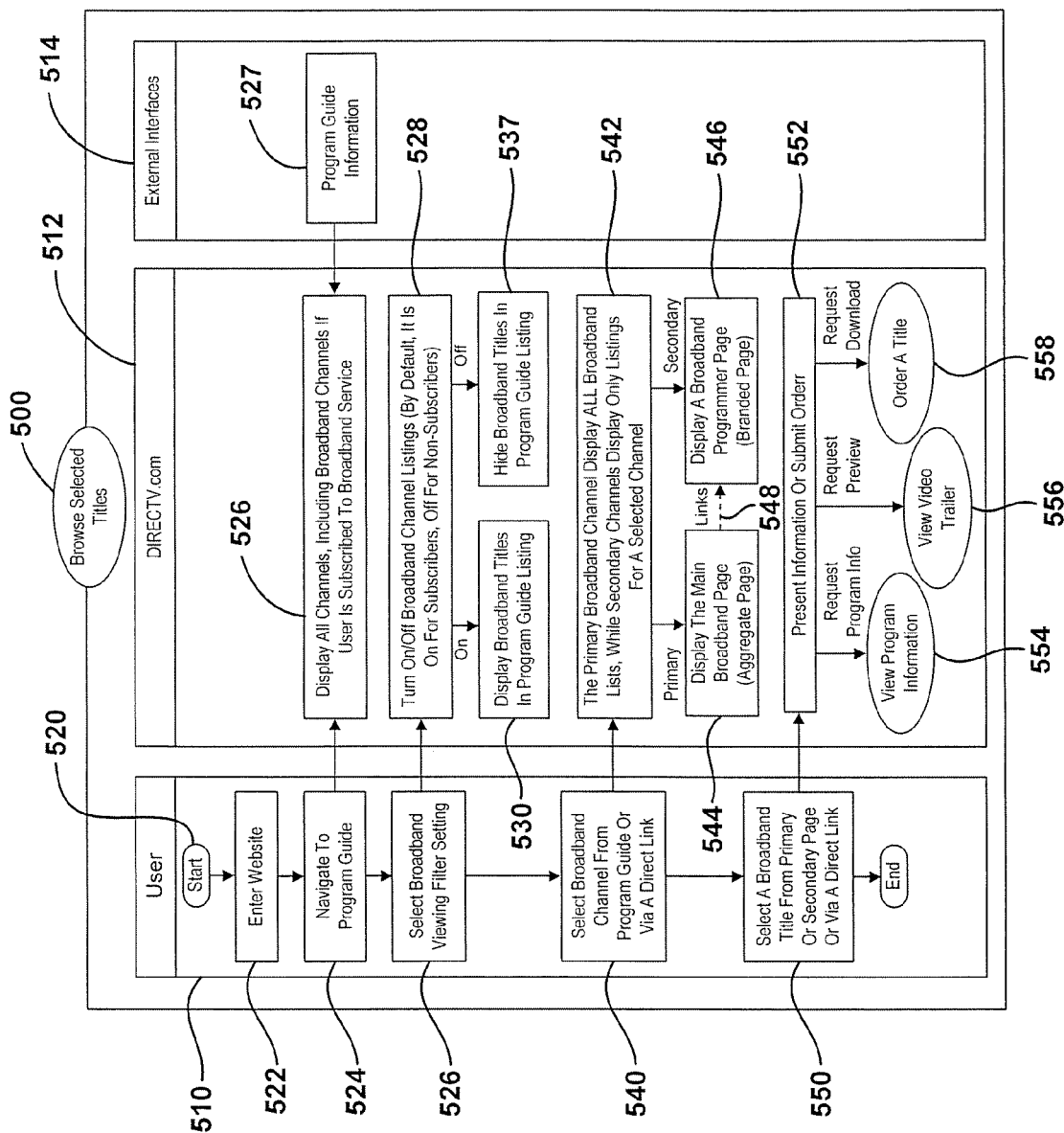
FIG. 5 is a flowchart of a method for browsing selected titles on an interactive interface.

Referring now to FIG. 5, a method for browsing and searching titles on an interactive interface is illustrated. In the following figure the steps are broken into the user steps 510, the DIRECTV.com® or interactive interface steps 512, and external interface steps 514. The interactive interface may be a website. It should be noted that the interactive interface may be available through many types of device including a mobile phone, a personal digital assistant, a smart device, a stand alone kiosk or in-flight entertainment systems. The process is started in step 520. In step 522, the interactive interface is entered. The interactive interface may be entered by providing a customer identifier and password. If one does not exist, an account may be set-up with a customer identifier and password associated with a particular account. In step 524, the user navigates to a program guide. The display in step 526 may display all channels including broadband channels (on-demand) if the users subscribe to the broadband service. That is, both broadband content and linear channels may be displayed. Linear channels are channels that are displayed and communicated in real time to the users such as normal network programming. Broadband service and broadband channels are available for communication to the user device only upon selection. The channels and selections are communicated to the interactive interface from the program guide system of the content processing system in step 527.

Referring back to step 524, a broadband selection filter may be applied to the channels so that only broadband channels may be displayed. In step 528, the interactive interface may turn on or off broadband channel listings. By default the broadband channel listings may be turned on for subscribers and off for non-subscribers. In the ON position in step 530, the broadband titles are displayed in the program guide listing. In the OFF position in step 532, the broadband titles are hidden in the program guide listing. It should be noted that the program guide listing may be received from the content processing system. The format of the programming guide and the contents of the programming guide may be received from the advanced program guide system 248, or the enterprise integration block 242 which provides the metadata from the content management system 221 of FIG. 2.

Referring back to step 526, a broadband channel may be selected from the program guide via a direct link on the screen in step 540. The interactive interface in step 542 displays all primary broadband channels, displays broadband lists while secondary channels display only listings for a secondary channel. In step 544, the main broadband page may be displayed or a secondary broadband programmer page may be displayed in step 546 which originates from step 542. The primary or main broadband page may be linked to a secondary broadband page as indicated by arrow 548.

After step 540, step 550 may be performed. In step 550, a broadband title may be selected from the primary or secondary page or via a direct link. The interactive interface in step 552, in response to step 550, may allow the user to view program information in step 554, view video trailers in step 556, or order a title in step 558. Steps 554, 556 and 558 are achieved by requesting programming information, requesting preview information, or requesting download information, respectively.

Figure 6:
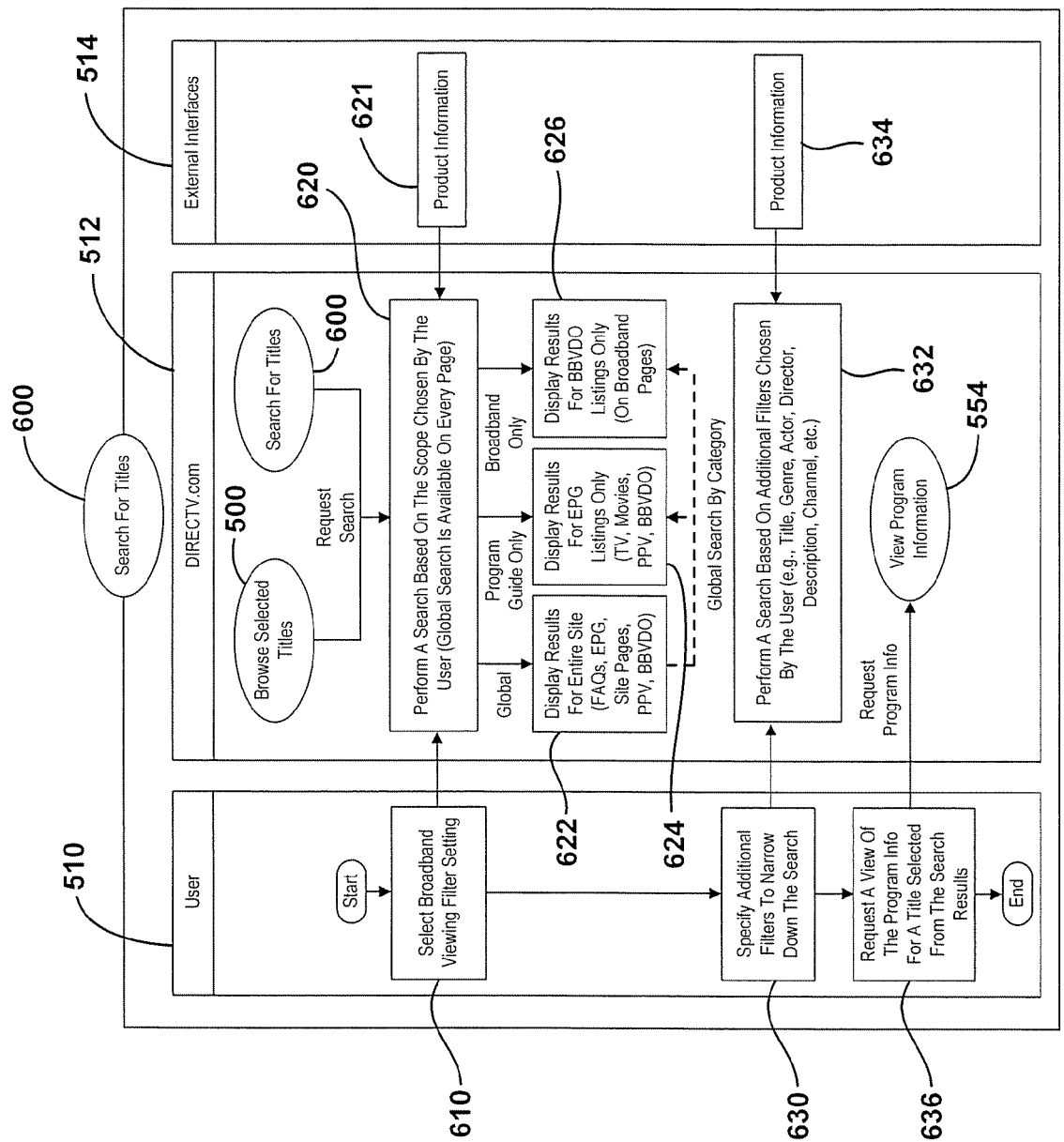
FIG. 6 is a flowchart of a method for searching titles on an interactive interface.

Referring now to FIG. 6, a search for a broadband title may be performed by entering a search string in step 610. By entering a search string, step 620 in the interactive interface may perform a search based upon the scope chosen by the user. A global search may be performed on every page. The search may also be entered in step 620 by browsing selected titles in step 500 or searching for titles in step 600. The search in step 620 may be performed using the product information received from the content processing system. This may be in the form of metadata, or the like. After step 620, if a global search was performed, step 622 displays the results for the entire site including frequently-asked questions, extended programming guide, site pages, pay-per-view sites, broadband video-on-demand sites. In step 620, if only the program guide was searched, step 624 displays the results for the extended program guide listings only meaning that TV, movies, pay-per-view and broadband video-on-demand results may be displayed. In step 620, if broadband-only video was requested for searching, only the results for broadband video-on-demand listings may be displayed.

Referring back to step 610, after step 610, step 630 may be performed. Step 630 may specify additional filters to narrow down the search. After step 630, the interactive interface in step 632 performs a search based on the additional filters chosen by the user. Examples of narrowing searches may provide key words in the title, the genre, the specific actor, the director, a description channel, etc. The information searched upon is received from the content processing system in step 634.

Referring back to step 630, step 636 requests a view of the program information for a title selected from the search results. Various information including the actors, running time and various other types of metadata may be illustrated at this point.

Figure 7:
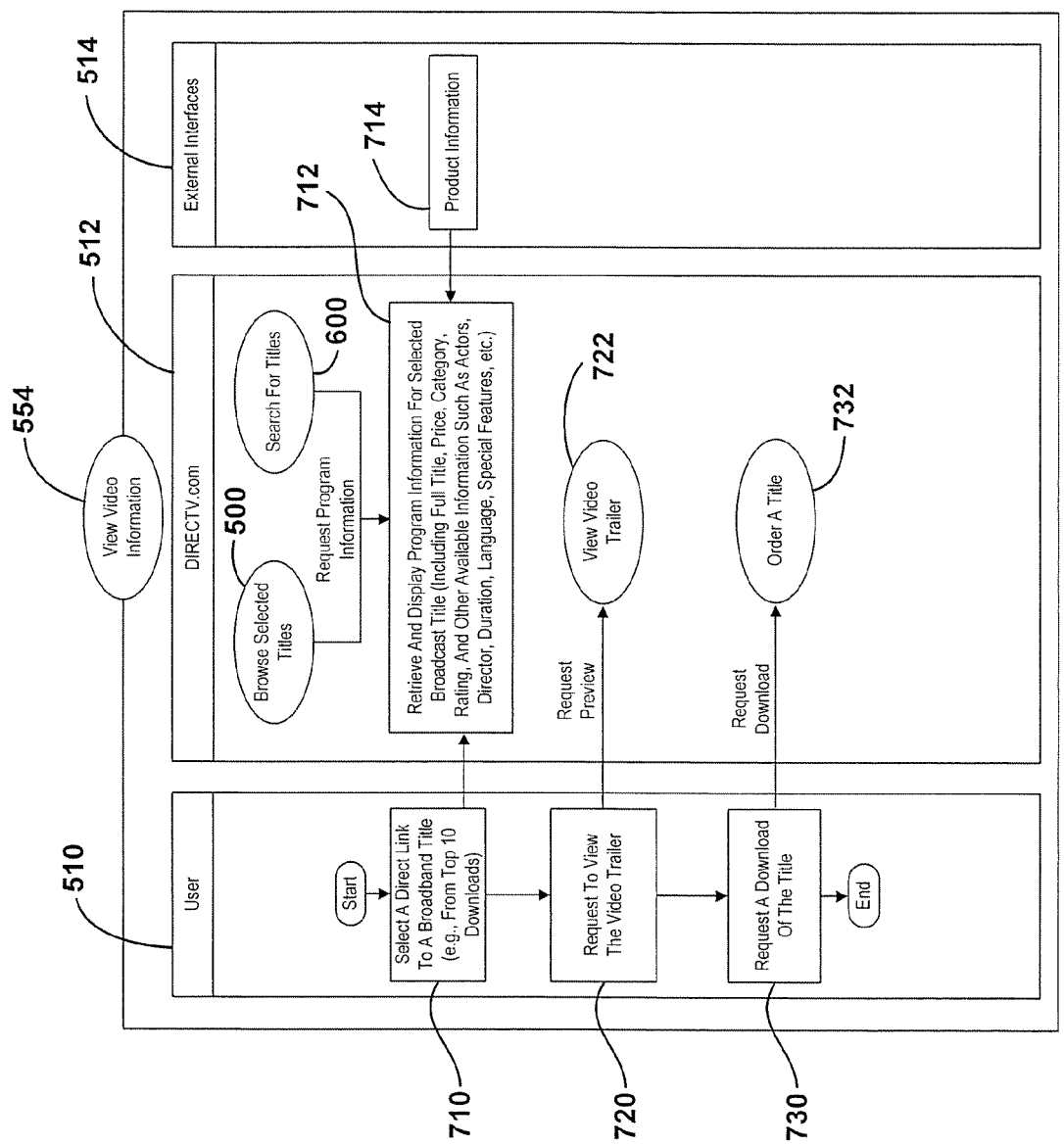
FIG. 7 is a method for viewing programming information on an interactive interface.

Referring now to FIG. 7, step 554 relating to viewing programming information is described in further detail. In step 710, a direct link to a broadband title may be provided. In step 712, the interactive interface may retrieve and display programming information for a selected broadband title. The broadband information may include the full title, the price, the rating, the category, or other available information such as actors, directors, duration, language and other special features. The product information may be received from the content processing system in step 514. Inputs to step 712 include browsing selected titles in step 500 and searching for titles in step 600. After step 710, step 720 requests to view the trailer. In step 722, the trailer is viewed.

After step 720, step 730 requests a download of the title. After step 730, the interactive interface orders a title in step 732. The details of step 722 and step 732 will be provided below in FIGS. 8 and 9, respectively.

Figure 8:
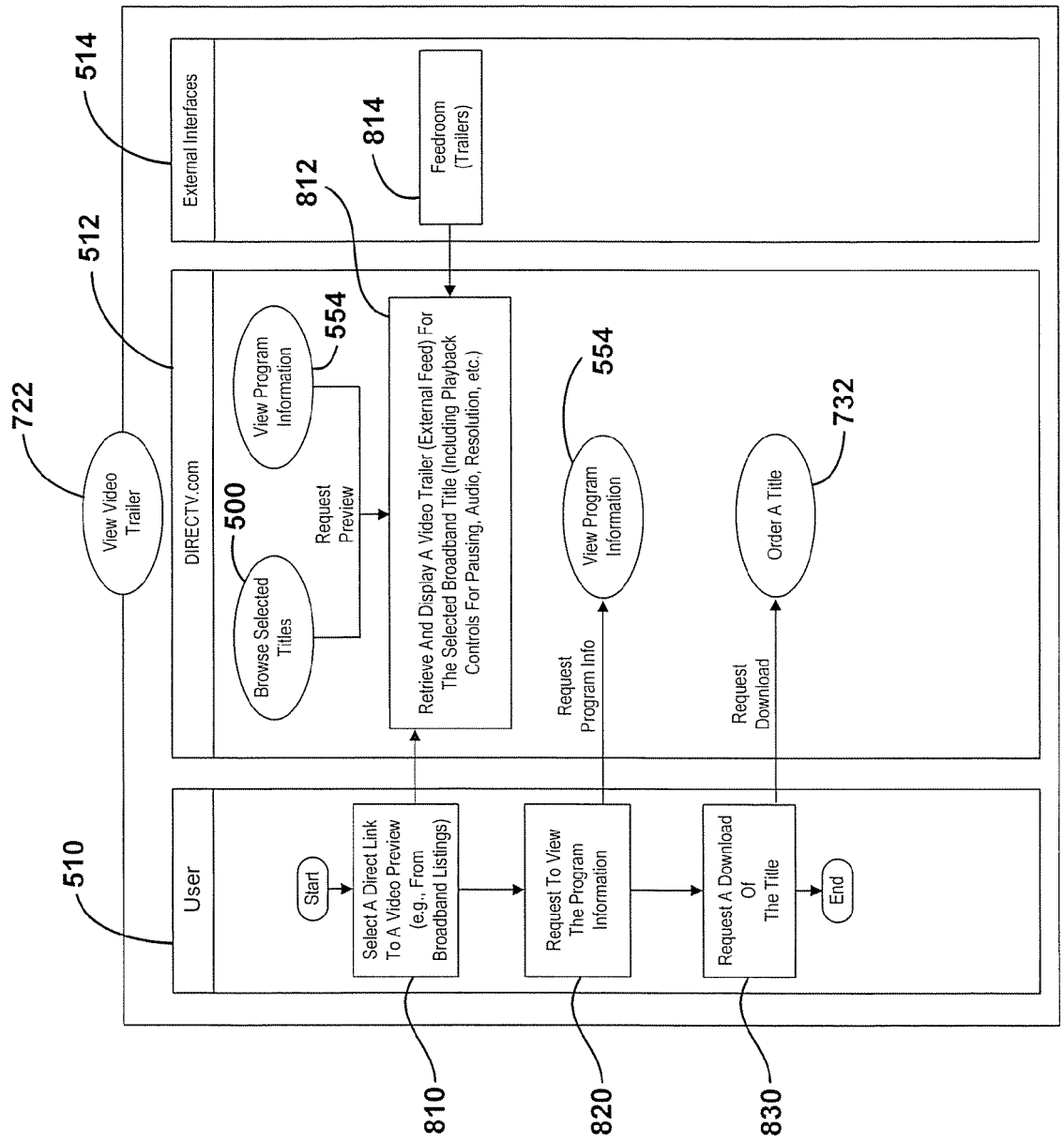
FIG. 8 is a method for viewing trailer video on an interactive interface.

Referring now to FIG. 8, step 722 of FIG. 7 is described in further detail. In step 810, a direct link to a video preview may be provided. In step 812, the video trailer is received and displayed through an external link for the selected broadband title. This may include the playback controls for pausing audio and resolution. This step may be entered from step 500 and step 554 described above. The trailers may be obtained from external interface 514 from a feed room or other metadata in box 814.

After the trailer is retrieved in step 812, step 820 requests to view the program information. Viewing the program information was set forth in step 554 above. After step 820, a download of the title may be requested through the interactive interface in step 830. After step 830, step 732 may be performed which includes ordering a title.

Figure 9:
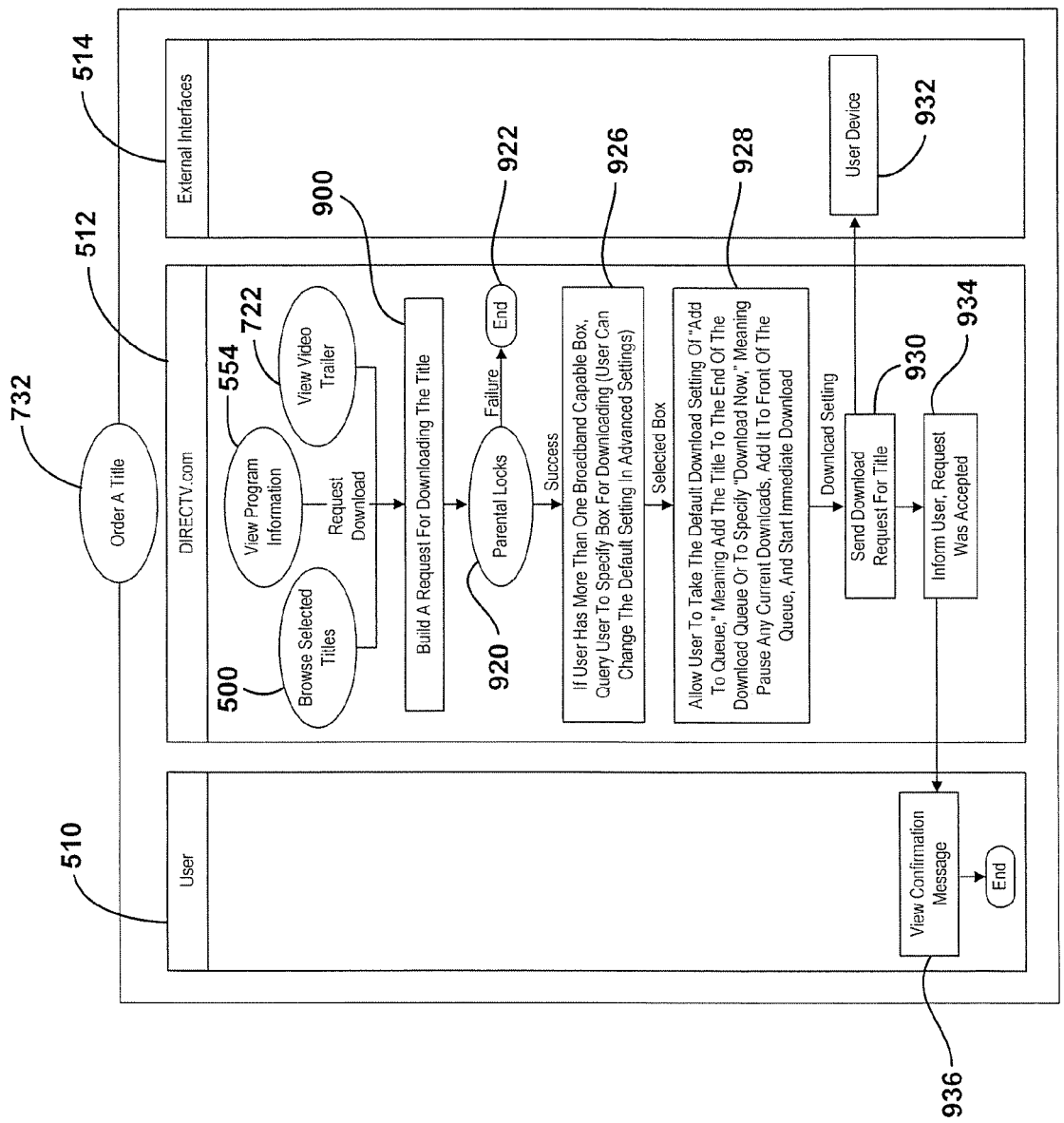
FIG. 9 is a flowchart for a method for ordering titles on an interactive interface.

Referring now to FIG. 9, the details of ordering a title of step 732 is described in further detail. The web page 512 may receive a request to browse selected titles 500, view program information 554 or view trailer information 722. These requests for download are provided to the build-a-request-for-downloading-the-title step of 900. In step 920, parental locks may be provided which may provide a failure and end the process in step 922. If parental locks have not been enabled, step 926 may be performed. If the user has more than one broadband-capable box, a query may be performed to ask the user for a specific box for downloading in step 926. The user may change the default settings in the advanced settings. After the box is selected in step 926, step 928 may allow the user to perform a priority for the default download setting. The add-to-queue selection may be performed to allow the user to add the title to the end of the download queue or to specify download now which pauses any current downloads and adds it to the front of the queue so that download starts immediately.

In step 930, the download request for a title is communicated to the user device 932. Download requests for a title may, for example, be communicated in a control word packet (CWP) or a conditional access packet (CAP) that is communicated to the user device. Communication of the CAP or control word may take place over the satellite, terrestrial system or a broadband system. The CAP provides information as to when the content may be broadcast through the satellite. If the content is a broadband-based title and will be received through a broadband connection, the particular content delivery network may be indicated in the CAP. In such a case, the Internet address for the particular content delivery network may be provided at that time.

A message informing the user that their request was accepted may be generated. This may be provided by way of an email or other confirmation to the user in step 936.

It should be noted that the menu for the various types of content available may include programming that is already started, future programming, linear programming or linear content. Broadband titles are on-demand, while other types of programming, such as linear programming, may also be provided in the menu.

Figure 10:
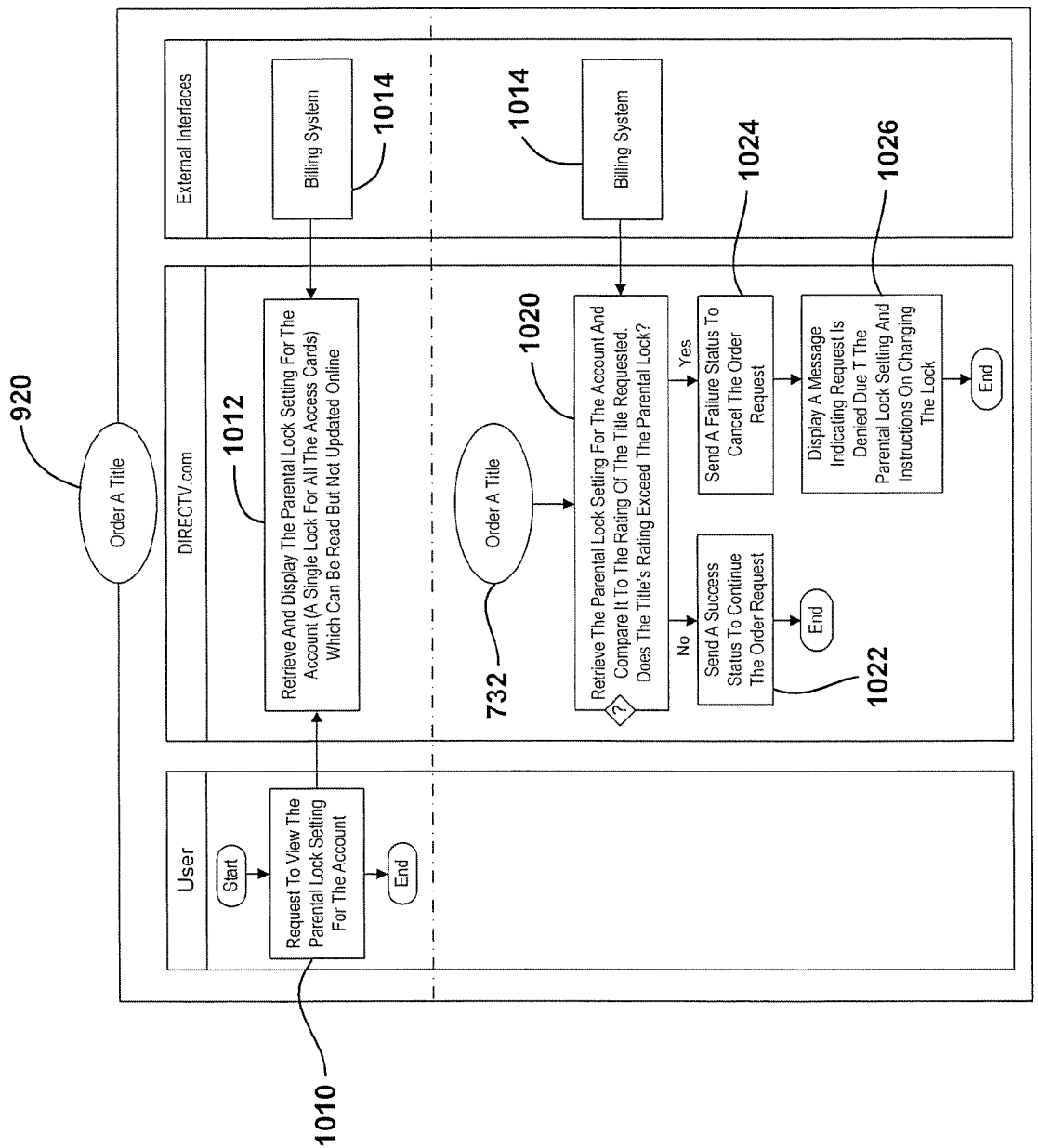
FIG. 10 is a method for providing parental locks on an interactive interface.

Referring now to FIG. 10, step 920 is illustrated in further detail. In step 1010, the user requests to view the parental lock setting for the account. In step 1012, a display is retrieved and the parental lock setting for the account is illustrated. A single lock for all of the user devices may be provided. This may be read but not updated online for one configuration. The parental lock information may be received from the billing system in step 1014.

After ordering a title in step 732, further details are provided with reference to the parental locks. In step 1020, the parental lock setting for the account is retrieved and compared to the rating of the title requested. If the title's rating does not exceed the parental lock, step 1022 sends a success status to continue the ordering request. In step 1020, if the parental lock setting is exceeded, meaning the content should be locked, step 1024 sends a failure request to cancel the order status. Thereafter, step 1026 displays a message indicating the request is denied due to the parental lock setting and instructions on changing the lock. Thereafter, the parental lock system ends and the process may be terminated at this point.

Figure 11:
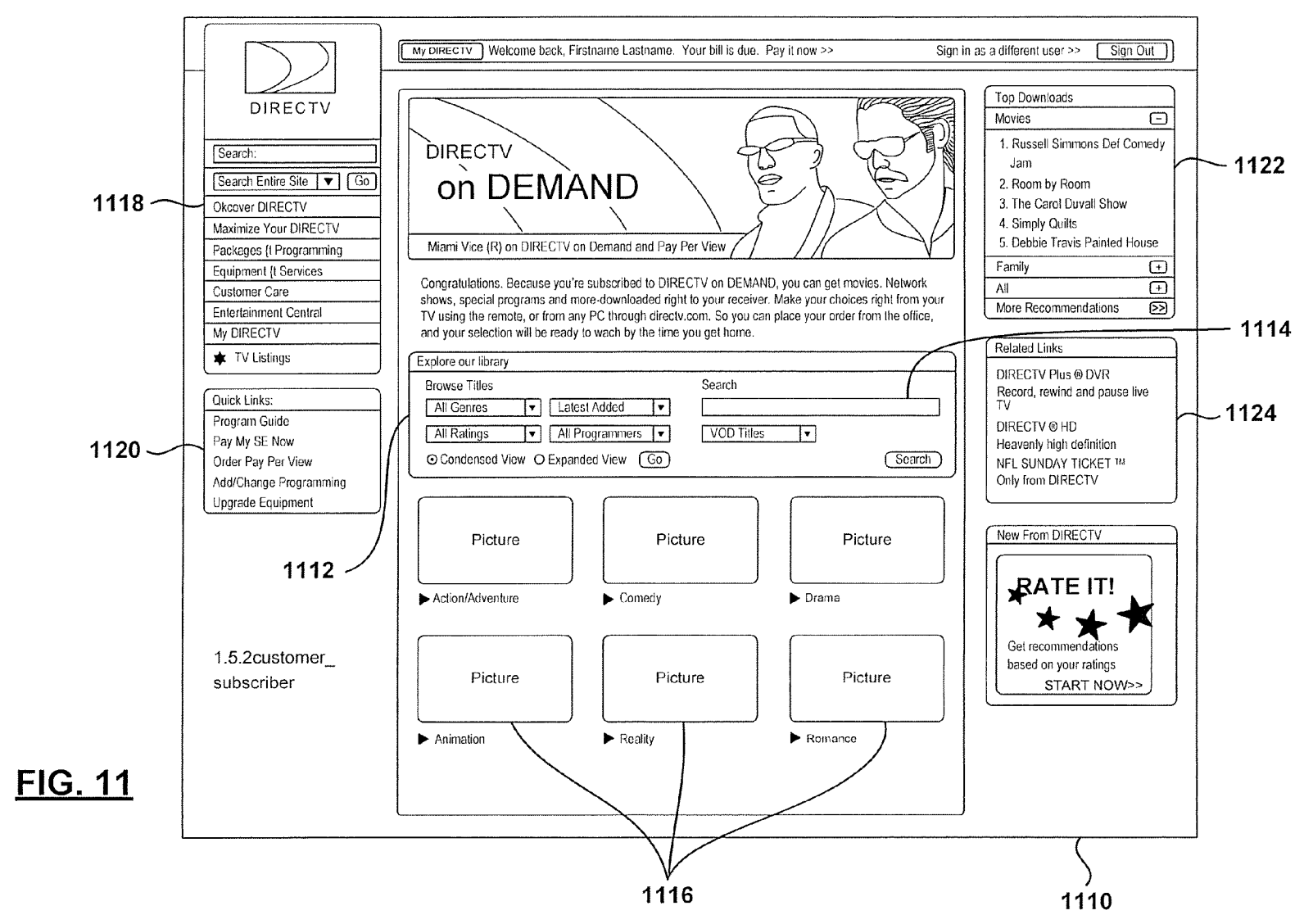

Referring now to FIG. 11, a screen display 1110 is illustrated. A browse title box 1112 may be provided for browsing various genres, the latest added content, various ratings and various programmers. Searching of titles may also be performed in box 1114. Certain categories may be directly linked by clicking the highlighted areas of 1116. Various other information, including links 1118, billing information 1120, the top down loads 1122 and related links regarding program and package availability may be set forth in box 1124.

Figure 12:
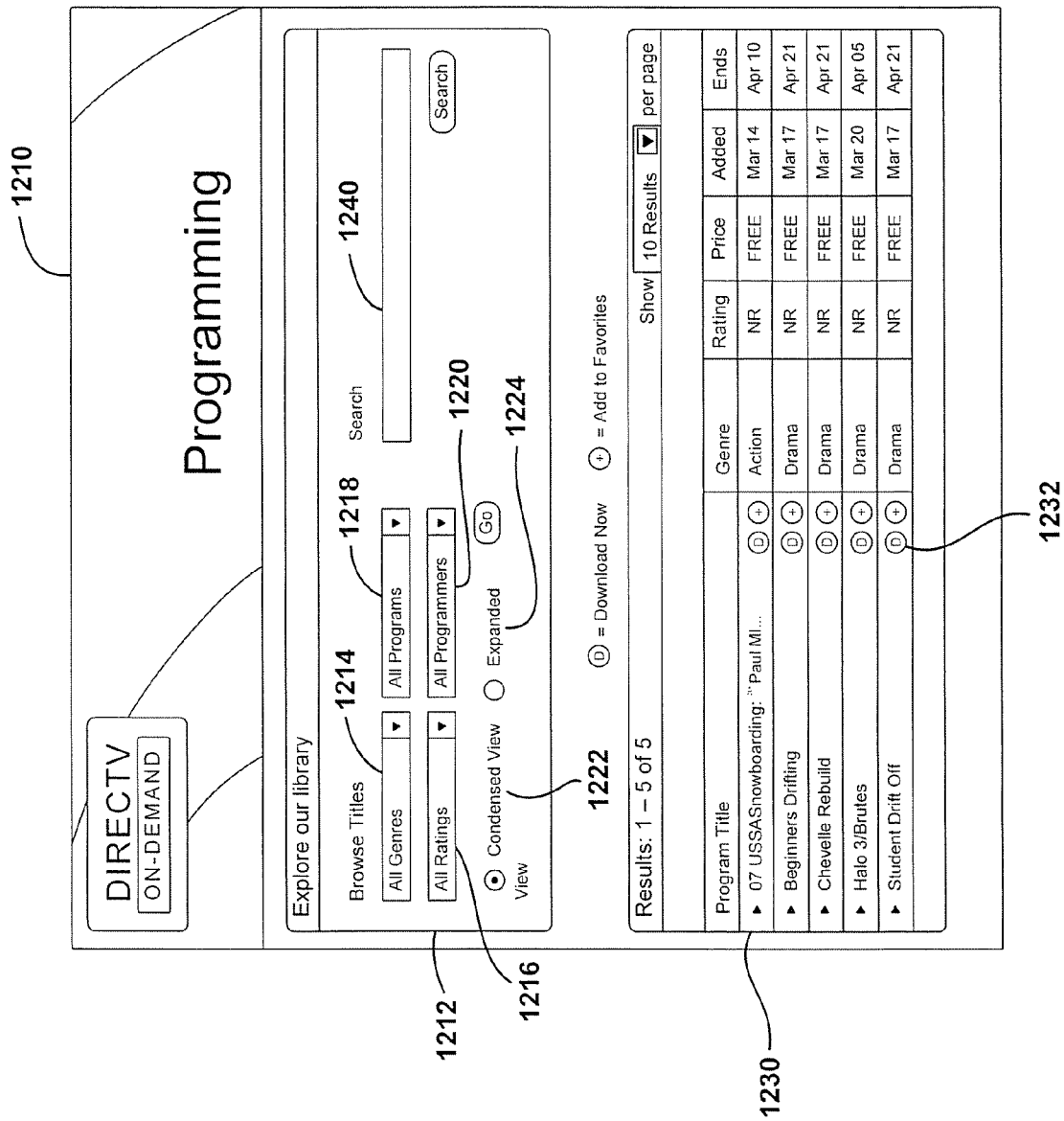
FIG. 12 is a more detailed menu display for browsing various video-on-demand titles.

Referring now to FIG. 12, a screen display 1210 is illustrated for the content processing system browser page. In this example, the DIRECTV® on-demand which provides content from various on-demand sources is set forth. As is illustrated, the browsing title box 1212 is illustrated for searching various genres 1214, searching various ratings 1216, searching various programs in box 1218 and various programmers in box 1220. The type of view may be selected as a condensed view as illustrated by 1222 or an expanded view in 1224. A menu 1230 displays various program titles, genres, ratings, prices when added and when the content will no longer be available. Searching may also be performed by typing various search words or search parameters in the search box 1240. From the menu, action may be taken by mouse-clicking or entering certain information.

Figure 13:
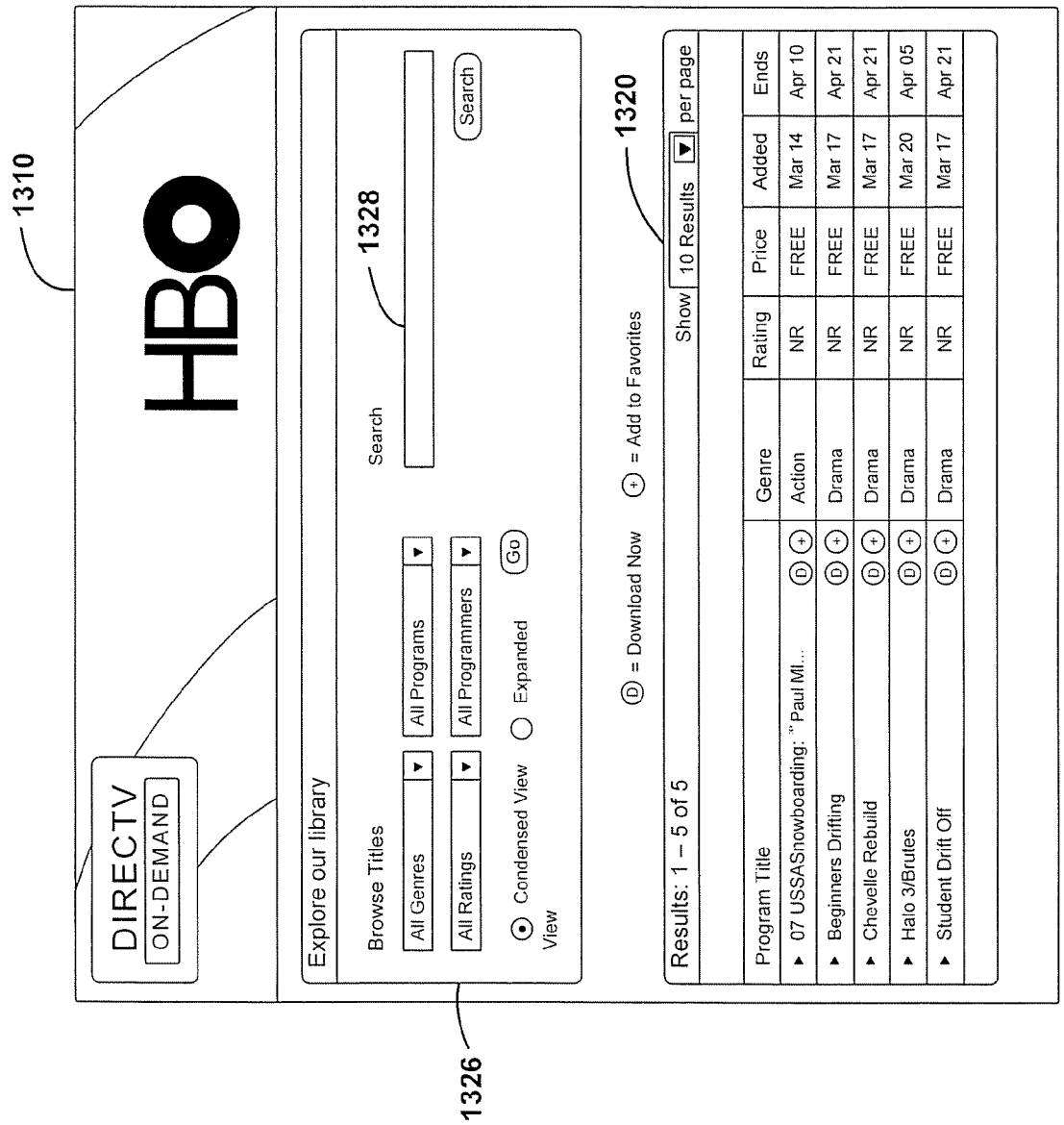
FIG. 13 is a screen display of a programmer-specific content page for browsing various titles available through the programmer.

Referring now to FIG. 13, a programmer screen display 1310 is illustrated. In this example, the menu 1320 illustrates various program titles, ratings and the like, such as those described above in FIG. 12 except that titles available only on the Home Box Office® video-on-demand site are provided. Again, a browse title box 1326 and a search 1328 may be provided for searching the titles within the particular programmer's page.

Referring now to FIG. 14, a search result menu page 1410 is illustrated. The results may be sorted in various manners, including by television programs 1412, by movies 1414 or by pay-per-view programs 1416. By selecting one of these, only the programming in that category will be displayed in the menu 1410. The menu display may be scrolled through with arrow keys and a download may be selected by selecting the download select indicator 1420. The price and end date of the availability of the content may also be provided in boxes 1422 and 1424, respectively.

Figure 15:
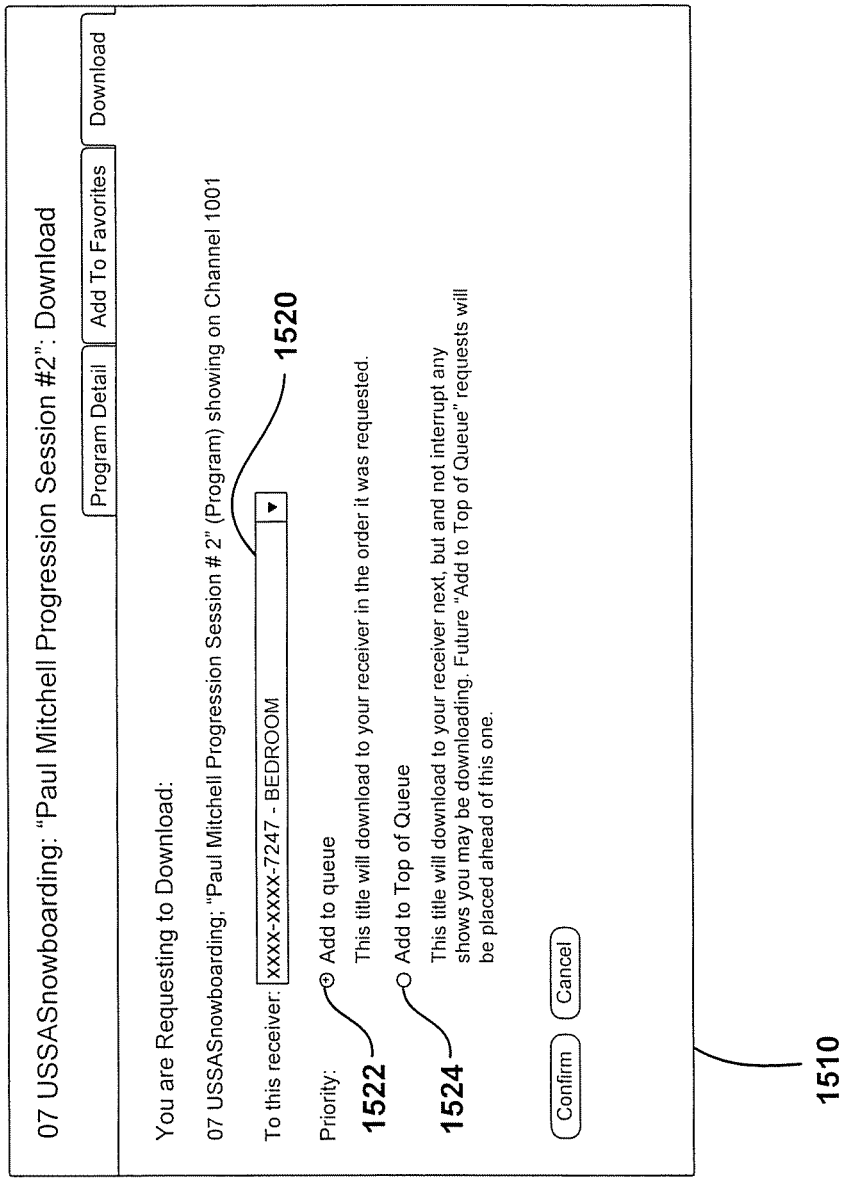
FIG. 15 is a screen display for determining the position of the queue.

Referring now to FIG. 15, an order download pop-up window 1510 is illustrated. The pop-up window corresponds to steps 926 and 928 above. In this embodiment, a receiver box 1520 may be used to select the particular receiver for which to download the information. An add-to-queue indicator may be selected for downloading to the receiver in the order it was requested. Another indicator 1524 may be provided for adding the particular selection to the top of the queue.

Figure 16:
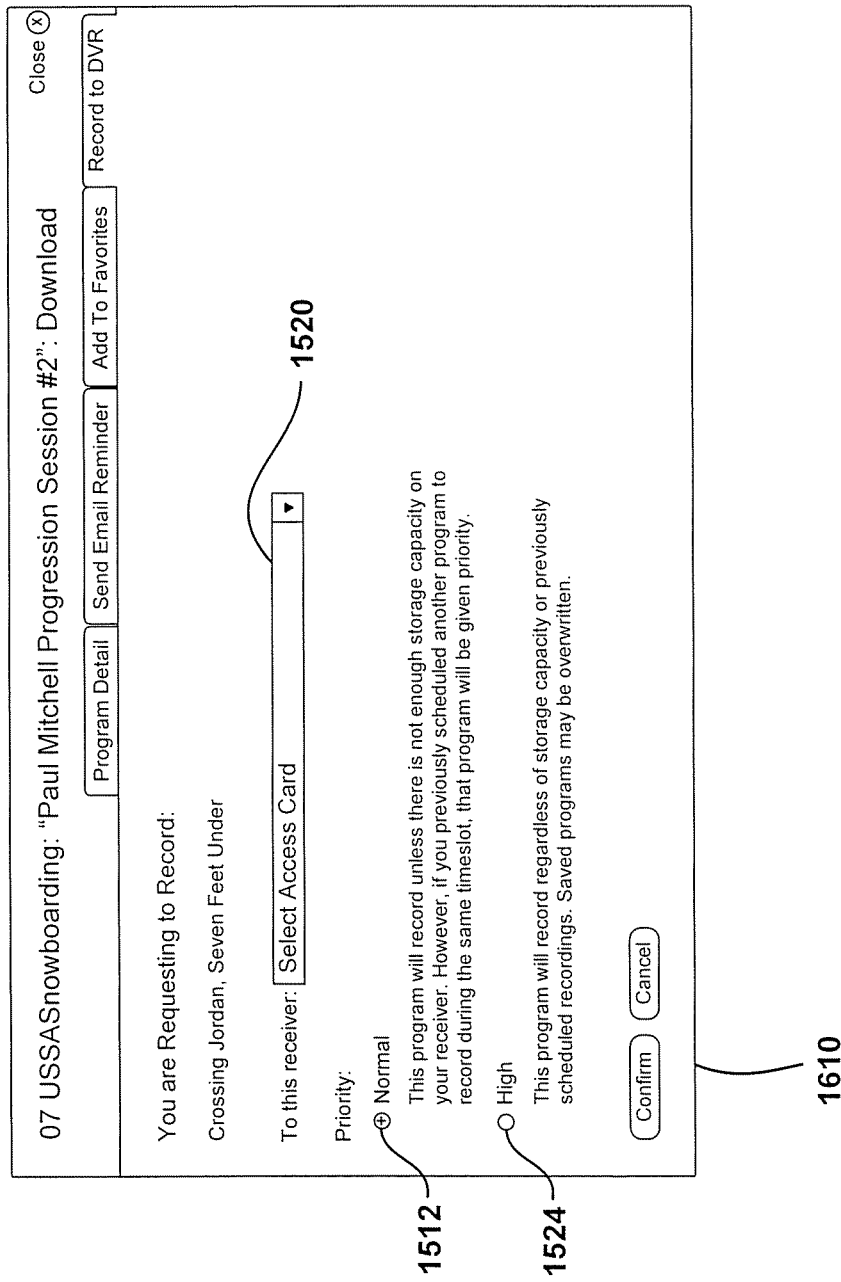
FIG. 16 is a screen display for prioritizing a requested video-on-demand title.

Referring now to FIG. 16, a menu display 1610 is illustrated for determining the priority of the request for download. A normal request indicator 1612 may be selected for normal, meaning that the program will record unless there is not enough storage capacity on the receiver. However, if a previously scheduled program is recorded during the same time slot, that program may be given priority. A high priority indicator 1614 may also be selected which records the program regardless of the storage capacity or previously scheduled programs. Also, saved programs may be overwritten. Preferably, programs to be overwritten may be the oldest programs in the user device. When requesting a linear content title, the request may be made high priority. Linear content refers to regularly broadcast content. The content may be requested even after the content has started.

Referring now to FIG. 17, a customer queue 1710 is illustrated. The customer queue includes a title or plurality of titles in a title column 1712 and a status column 1714. By way of example, the titles may include rows of titles including title Q, title R, title S and title T. Although various titles are illustrated, various numbers of titles may be set forth in the title column 1712. As will be described below, various titles may be added or deleted based upon selections from the menus. The menus may be accessed through a website or the set top box as described above. The queue 1710 may also be added to in response to selections made from a mobile device as will be described below. The customer queue 1710 may reside in the content processing system 102. Within the content processing system 102, the queue may reside in various locations such as within the billing system or transaction system 234.

Figure 18:
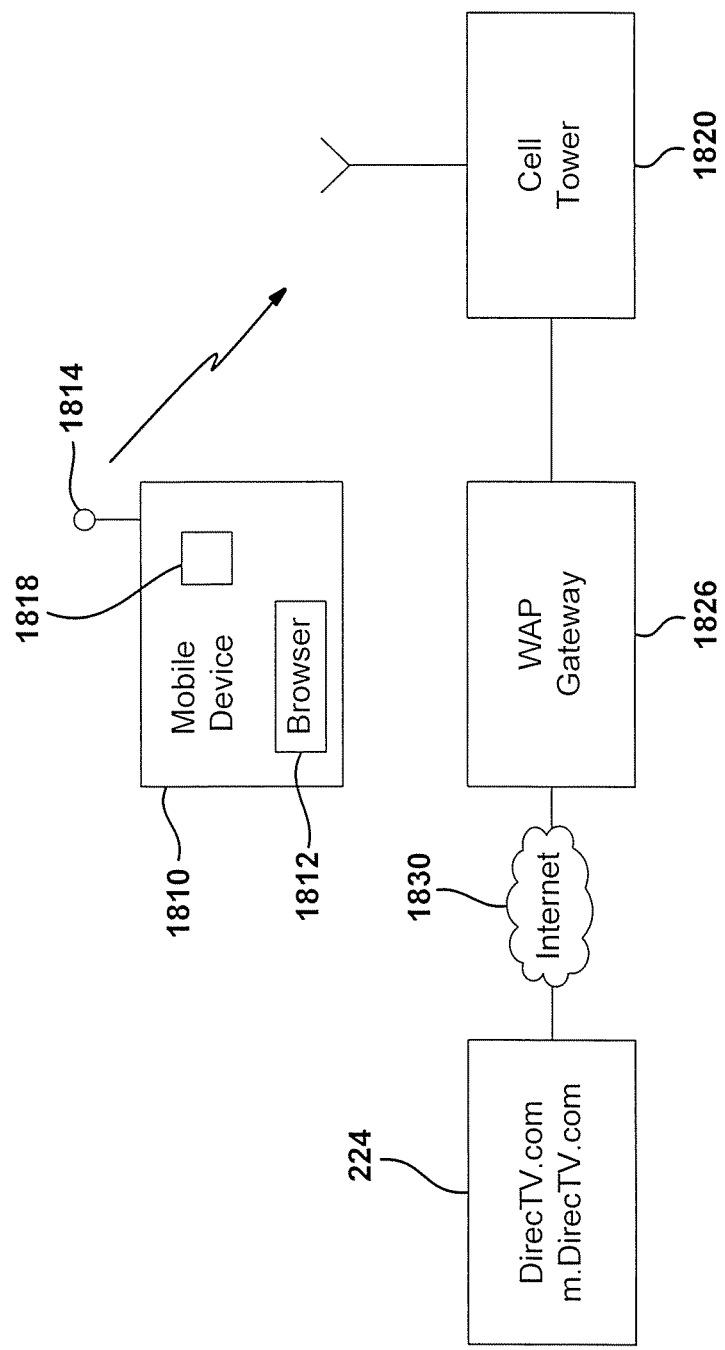
FIG. 18 is a simplified block diagrammatic view of a mobile device in communication with a website.

Referring now to FIG. 18, a simplified block diagrammatic view illustrating a mobile device 1810 that includes a browser 1812 therein that communicates through an antenna 1814 with a cell tower 1820. The mobile device 1810 may be various types of devices including a mobile phone, a personal digital assistant or other type of wireless device.

The browser 1812 is a browser suitable for wireless communication. The mobile device 1810 may communicate using a wireless application protocol and thus the mobile device may be described as a WAP-enabled device. As will be described below, the wireless device may include a display 1818 suitable for displaying a simplified menu structure compared to that described above. The simplified menu structure may include functions specifically for a mobile device and other functions available both from a mobile device and from DirecTV.com through the internet of a regular computer.

The cell tower 1820 transmits and receives signals from the mobile device and communicates the received signals to a gateway 1826 such as a wireless application protocol gateway. The wireless application protocol gateway may allow the communications to and from the cell tower 1820 and thus to and from the mobile device 1810 to communicate with or through the internet 1830. The internet provides information to the DirecTV.com web interface 224 which is also illustrated in FIG. 2. The DirecTV.com interface for wireless application protocol may include a mobile web interface such as m.DirecTV.com.

Figure 19:
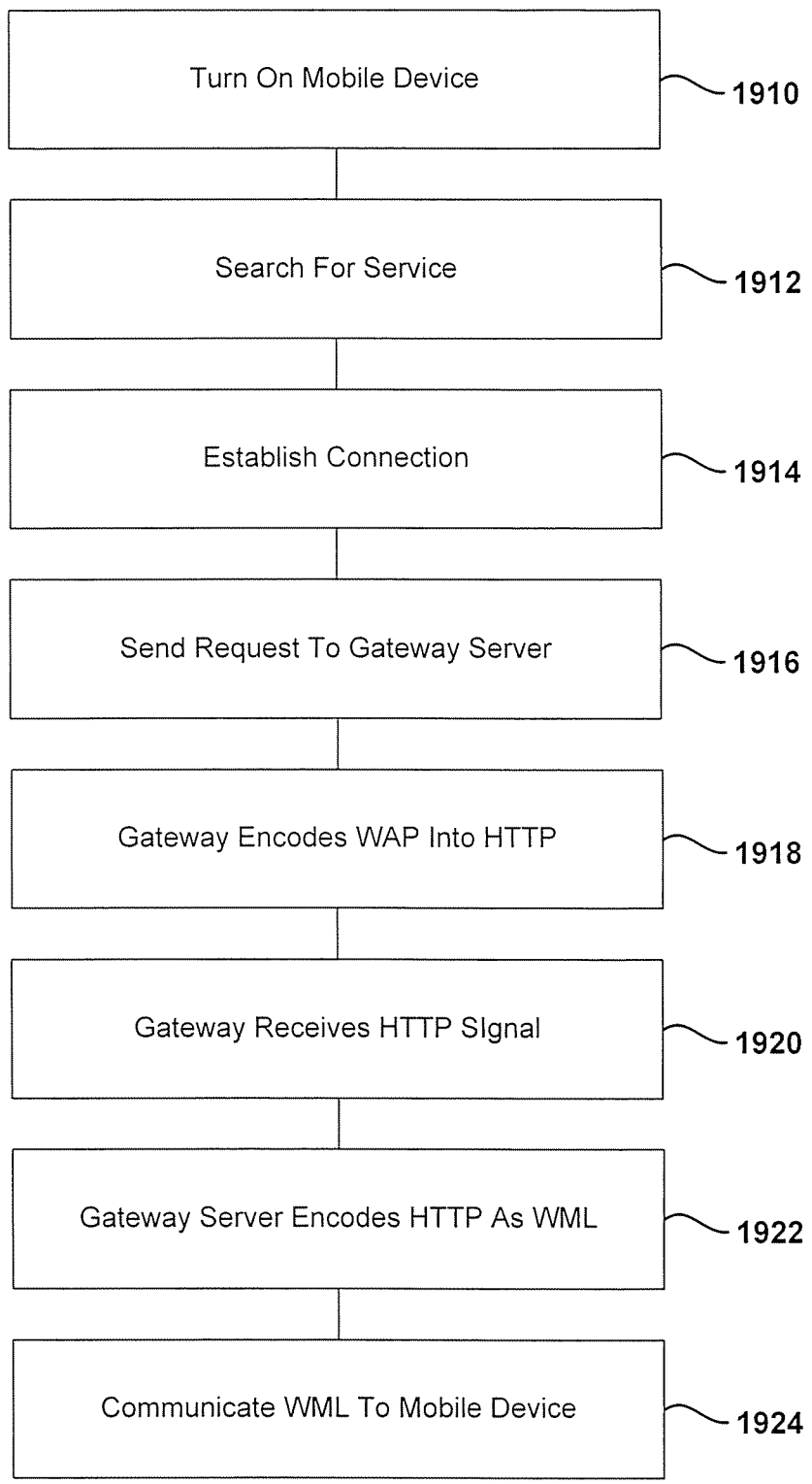
FIG. 19 is a flowchart of a method for a mobile device accessing a service website.

Referring now to FIG. 19, a method for a mobile device to access the service website such as DirecTV.com is set forth. In step 1910, the mobile device is turned on. In step 1912, a search for service through various types of wireless connections may be established. In step 1914, a connection is established with the cell tower 1820 of FIG. 18.

In step 1916, a request is sent to the gateway server 1826. A request may include various types of requests such as a request to access a particular website. The request is sent using a wireless application protocol (WAP). In step 1918, the gateway encodes the signal transmitted through the wireless application protocol. The wireless application protocol signal may include signals in a wireless mark-up language (WML). In response to the HTTP signal sent from the gateway, the website responds with a signal. In step 1920, the gateway receives the HTTP signal and, in step 1922 the gateway server encodes the HTTP signal as a wireless markup language signal in step 1922. After step 1922, step 1924 communicates the wireless markup language signal to the mobile device. As will be described below, various types of ordering confirmations and the like may be transmitted through the gateway using a wireless device.

Figure 20:
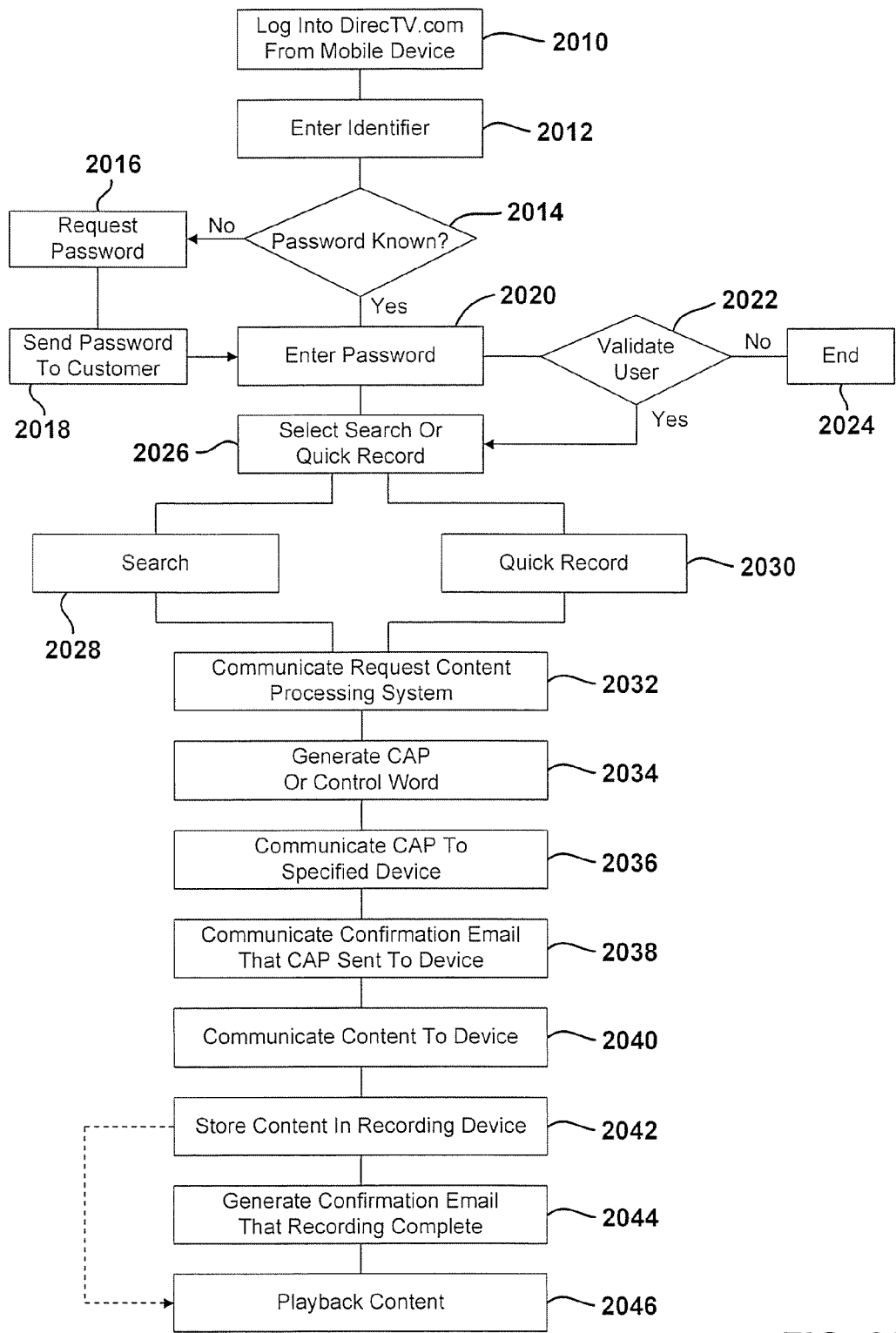
FIG. 20 is a flowchart of a method for operating and interacting with a website for ordering mobile content.

Referring now to FIG. 20, a method for operating a mobile device is set forth. In step 2010, the mobile device logs into the system such as DirecTV.com for scheduling content to be communicated to a set top box or the like. In step 2010, the steps illustrated in FIG. 19 may be performed to allow the mobile device to access a particular website.

In step 2012, an identifier such as an account identifier may be provided to the system. The identifier may include a user name or e-mail that is identified with a particular account. The identifier may also include a particular account. It should also be noted that the identifier may automatically be remembered by the system after an initial log-in. This may be done by remembering the device has logged in, in a cookie-like manner. In step 2014, if the password for the account associated with the identifier is not known, a request for a password may be transmitted in step 2016. Thereafter, the password may be sent to the customer by way of an e-mail in step 2018. After steps 2018 and step 2014, the password may be entered into the system in step 2020. After step 2020, the user may be validated in step 2022. If the password is incorrect, the user is not validated and the method ends in step 2024. If the user is validated in step 2022, step 2026 is performed.

In step 2026, a screen display or user interface is provided to the mobile device whereby different selections may be selected. The selections may include a search or a quick record function. Both the searching and the quick recording functions will be described below in other figures. In step 2028, the searching function is chosen. In step 2030, a quick recording is chosen. The signals that are generated in response to the search request or the quick recording request are communicated to the content processing system in step 2032. A request may be communicated through the gateway 1826 of FIG. 18.

In step 2034, a conditional access packet or control word is generated in response to the request signal. The request may be provided from the web interface 224 through the enterprise integration module 242 through the conditional access transaction system 238 all of FIG. 2. The CAP or control word may include various information such as the particular content delivery network or the particular transponder on the satellite that will correspond to the content. In step 2036, the CAP is communicated to the specified device through the satellite. The CAP may also be communicated through a broadband network to the specified device. The specified device may be a set top box suitable for receiving both broadband communications and satellite communications.

In step 2036, a confirmation e-mail may be sent to the e-mail associated with the account that a CAP was successfully sent to the device. The e-mail step is, of course, an optional step. The email is generated in the content processing system through a web interface such as Directv.com.

In step 2040, the content is communicated to the device in response to the CAP or control word. The CAP may contain information as to the specific content delivery network 280 of FIG. 2 that includes the content. The CAP may instruct the set top box to retrieve the content from the content delivery device. If the content is communicated by way of satellite, the CAP will tune the set top box to receive communications from a particular transponder of a particular satellite within the satellite system.

In step 2042, the content is stored in the recording device within the set top box. The recording device, as mentioned above, may be a digital video recorder. In step 2044, once the entire content is communicated to the set top box and stored in the recording device, an e-mail may be generated that describes that the recording has been completed in step 2044. In step 2046, playing back the content may then be performed. It should also be noted that after step 2042, step 2046 may be completed without the performing step 2044.

Step 2044 may generate the e-mail in various manners. For example, the set top box itself may generate an e-mail through a broadband connection and communicate the e-mail or direct the e-mail to the e-mail associated with the account. The e-mail may also be communicated or initiated at the content delivery network. A "successful" or confirmation signal may be generated at the set top box when a broadband content is delivered successfully. The confirmation signal may be used by the content delivery network and to communicate the signal to the content distribution system and that through the billing system or the like. The content processing system may then generate an e-mail to the specified e-mail of the account.

It should be noted that the process of FIG. 20 may be used to select both linear content, meaning regularly broadcasted live channels or on-demand content that is provided through the content repository or the like.

Figure 21:
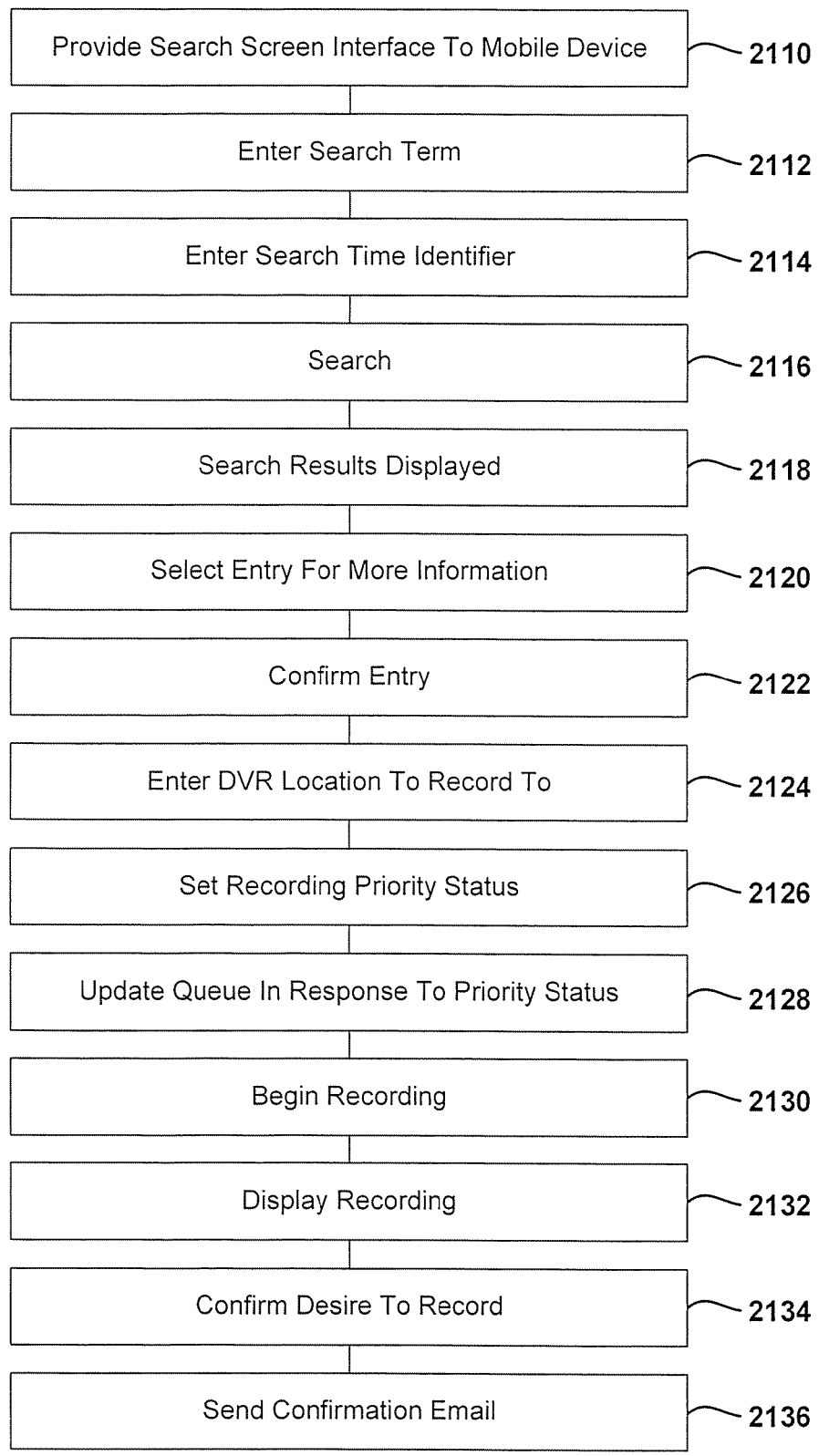
FIG. 21 is a flowchart of a method for searching for content using a mobile device.

Referring now to FIG. 21, a method of searching corresponding to box 2028 is set forth. In step 2110, a search screen interface is provided to the mobile device. The search screen may include various types of searches such as a title search, a channel name search or a channel number search. A box for entering the particular search terms may be provided. Partial or whole words in searching. Searching may be provided for on-demand content or live (linear) content, or both.

In step 2112, a search term is entered. As mentioned above, a whole or partial search term may be entered. The search term alone may be searched. However, time restrictions may also be provided. In step 2114, a search time identifier may be set forth by a selection on a user interface. For example, the search term identifier may include boxes that include a time limitation of searching today, tomorrow, or the next 14 days. A default of up to 14 days may be established by the content provider.

In step 2116 the content is searched. The content from the program guide is searched. This may include on-demand and live or linear programming, or both.

In step 2118, the search results of various content selections may be displayed on the screen. If several search results are retrieved, a search display may be scrolled to view the various titles. In step 2120, an entry may be selected. More information may be provided such as more show times, various related programs, more episodes of a particular program or the like. After a selection is suitable, a confirmation of the entry is provided in step 2122.

In step 2124, a DVR location to record to is provided. The digital video recorder (DVR) location may be various locations throughout a household associated with the account. The locations may include a living room, family room, kitchen, bedroom or the like.

In step 2126, a recording priority status may also be provided. A recording priority status may be high priority meaning record this particular programming even if another programming is currently being recorded. The lower priority program may be resumed after recording of the higher priority programming. Another priority may be recorded if possible. This may allow the recording to be placed in the queue directly after the currently recording content.

In step 2128, the queue is updated in response to the priority status. As mentioned above, a recording request may be placed at the top of the queue and all other recording stopped or at the bottom of a queue or if no other recordings are on the schedule. In step 2130, the recording of the content is begun. In step 2132, a recording instruction such as the request to record title A on channel 501 at 10:30 a.m. on December 19$^{th}$ has been received. In step 2134, the user may confirm this by selecting an OK button or other type of user interface. In step 2136, a confirmation e-mail may be sent confirming that the CAP or control word has been sent to the set top box. A second e-mail may be generated confirming that a recording is completed such as that illustrated in step 2044 above.

Figure 22:
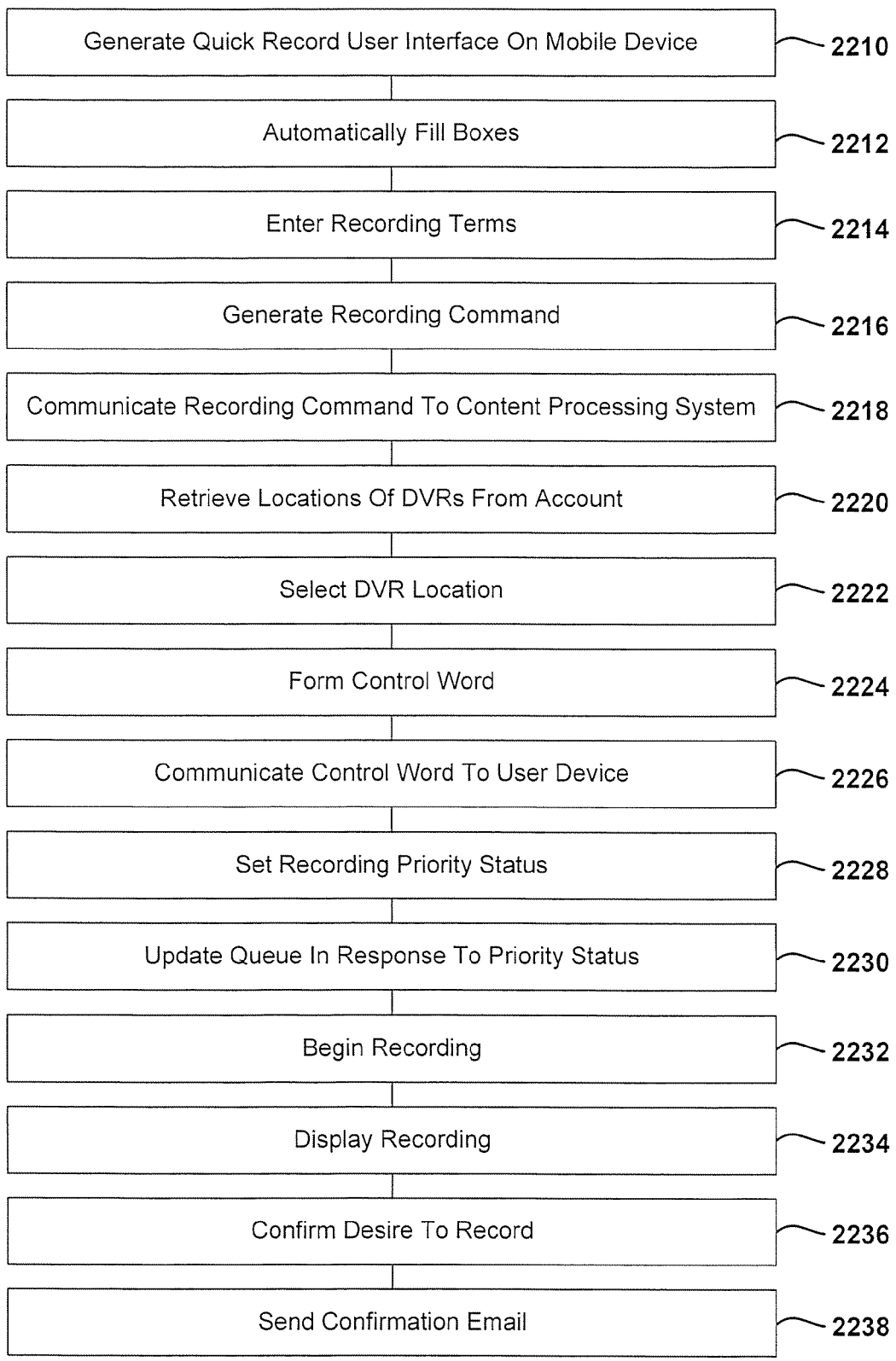
FIG. 22 is a flowchart for quick recording of content from a mobile device.

Referring now to FIG. 22, a method corresponding to step 2030 of FIG. 20 is illustrated in further detail. In step 2210, a quick recording selection at the user interface is selected from the mobile device. A quick recording menu will be further described below. However, a quick record may include, but is not limited to, a channel, a particular time, a duration and a date.

In step 2212, the boxes within the quick record menu are automatically filled in for the current date, a default time such as one hour and the current time. This will allow the quick record function to be used very quickly. Should other times be desirable, the default times may be overridden. In step 2214, the various recording terms may be provided in the various boxes. These may be override default terms as mentioned above. In step 2216, a recording command may be generated in response to the recording terms. In step 2218, the quick recording command may be communicated to the content processing system 2218. The content processing system may receive the command through the web interface 244 FIG. 2.

In step 2220, optional steps of retrieving the locations of the DVRs associated with the accounts may be performed. In step 2222, the location of the DVRs may be selected by the user. The location may be selected so that the particular content may be recorded on a particular DVR associated with the account. Selecting the location may be performed on the mobile user device by selecting a piece of graphics from the user interface. In step 2224, a control word is formed in response to the recording command and possibly from the DVR location. In step 2226, the control word is communicated to the user device. Steps 2126-2136 may also be performed, that is, the priorities adding to the queue and confirmation e-mails may be also be performed by this aspect of the system.

Figure 23:
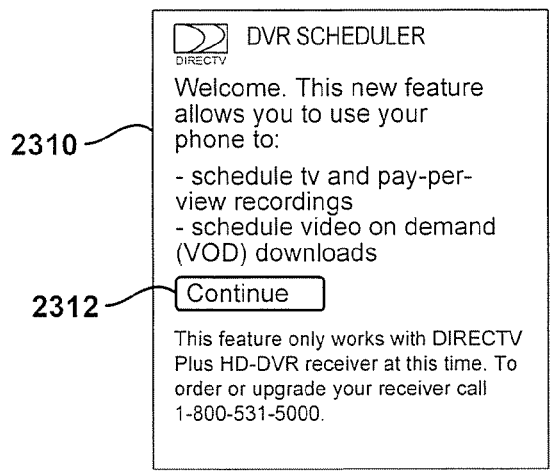
FIG. 23 is a screen display for scheduling the recording of a DVR.

Referring now to FIG. 23, a welcome screen display 2310 is illustrated welcoming the user to mobile DVR scheduler. The introductory screen display 2310 may include a continue button 2312 that may be activated through the user interface by moving the arrow keys and the like on the mobile device. After the continue display is set forth, the user may be asked to sign in.

Figure 24:
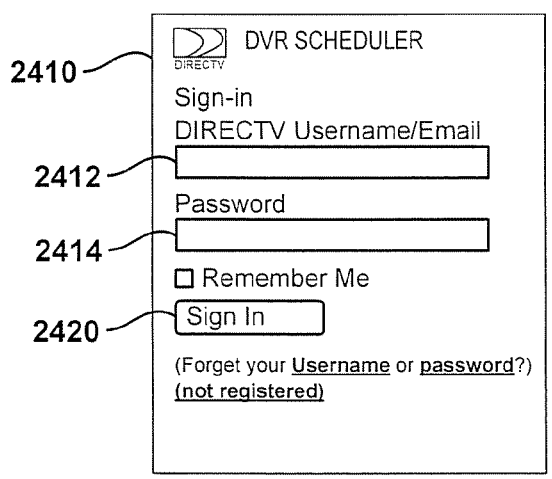
FIG. 24 is a screen display illustrating a first login page for a DVR scheduler.

Referring now to FIG. 24, a sign-in display 2410 is illustrated having an identifier box 2412 and a password box 2414. The identifier box 2412 may include a user name or e-mail associated with the account. This may automatically be remembered by selecting the "remember me" box 2416. To sign in, the user may perform keystrokes on the mobile device and the sign-in box 2420 may be activated.

Figure 25:
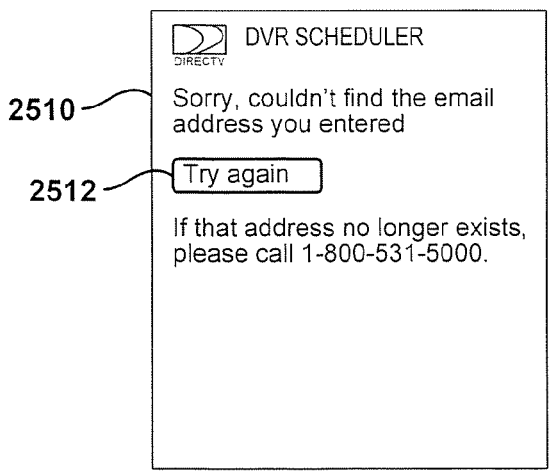
FIG. 25 is a screen display of a DVR scheduler when the email entered in FIG. 24 is not found.

Referring now to FIG. 25, screen display 2510 illustrates that the identifier such as the e-mail address could not be found. A try-again button 2512 may be provided to the user to try the display of FIG. 24 again.

Figure 26:
FIG. 26 is a screen display illustrating lack of support for phone registration.

Referring now to FIG. 26, after logging on to the system, a message may be displayed on the screen display 2610 communicating that registration via the mobile phone may not be provided. FIG. 26 illustrates an example of eliminating or providing a message 2612 to a user illustrating that registration by way of a mobile phone is now set forth.

Figure 27:
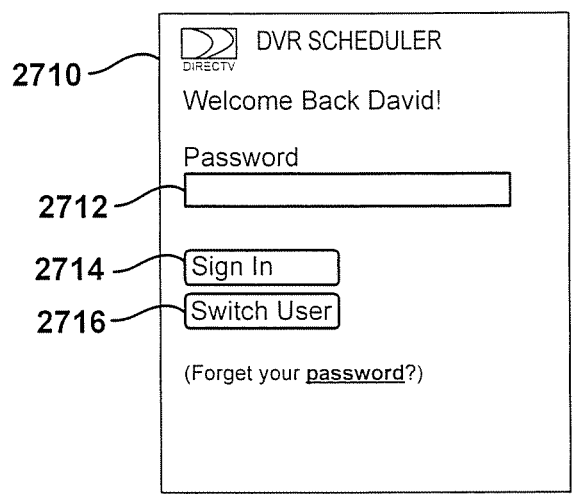
FIG. 27 is a screen display of a DVR scheduler where the user name or identification is remembered.

Referring now to FIG. 27, a user may be remembered as described above and as illustrated in the screen display 2710. A password box 2712 may be provided. Only a password may be provided since the user identification has been remembered by the system. The screen display 2710 may also include a sign-in box 2714 and a switch user box 2716. The sign-in box 2714 may be used to sign in after a password has been selected. A switch user box 2716 may be provided if a different user besides the default user is desired for signing in using the particular mobile device.

Figure 28:
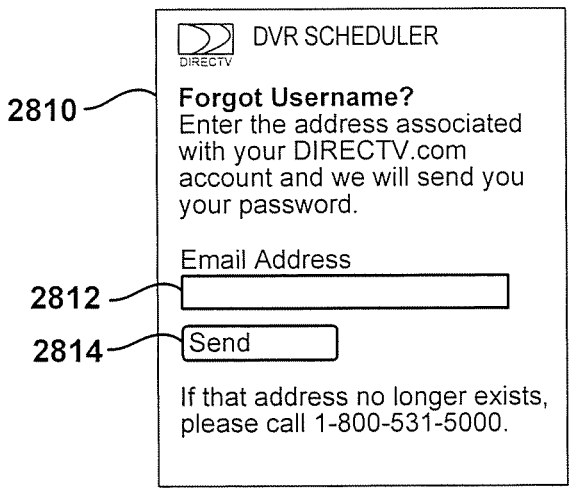
FIG. 28 is a screen display for a DVR scheduler used when the user name has been forgotten.

Referring now to FIG. 28, a screen display 2810 is illustrated for the situation where a user has forgotten their particular user name. The user name may be sent to the e-mail address that is entered in the e-mail box 2812 by the mobile device user. Box 2814 may be activated to send the e-mail address to the system so that a response may be provided.

Figure 29:
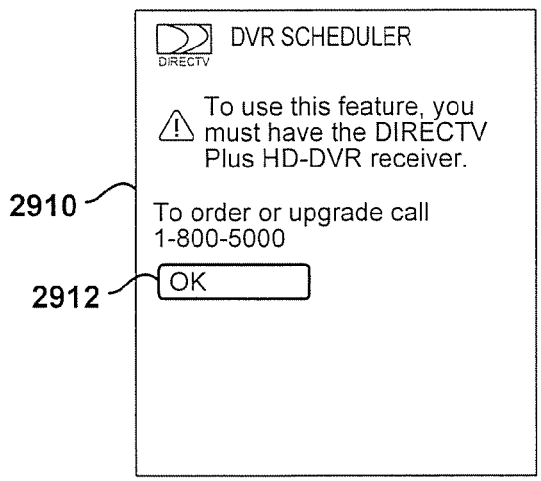
FIG. 29 is a screen display illustrating the DVR scheduler requires an HD DVR.

Referring now to FIG. 29, a screen display 2910 is provided to the user when a high definition DVR receiver is not associated with the account. The system may work when certain equipment such as the set top box has a high definition DVR receiver. Of course, other warning messages associated with various user equipment requirements may be set forth. An "ok" box 2912 may be selected to exit the scheduler.

Figure 30:
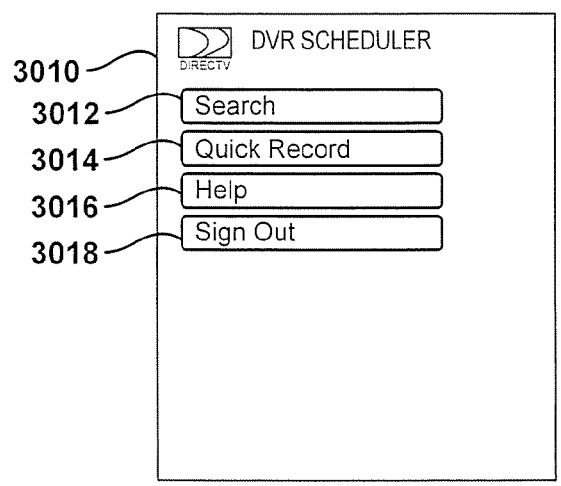
FIG. 30 is a screen display of an interface for the DVR scheduler for performing various functions.

Referring now to FIG. 30, a screen display 3010 corresponding to various options that may be performed by the scheduler. The display 3010 may include a search box 3012 that is used for performing various types of searches as will be described below. A quick record box 3014 may also be selected so that quick recording of a particular channel may be provided.

A help button 3016 and a sign-out button 3018 may also be provided on the display 3010.

Figure 31:
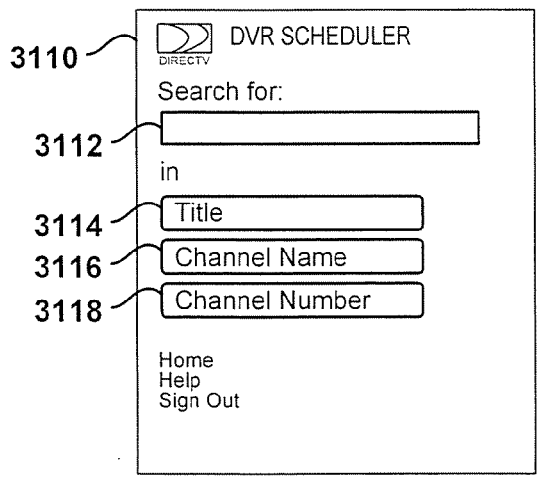
FIG. 31 is a screen display for searching using the DVR scheduler.

Referring now to FIG. 31, if the search button 3012 of FIG. 30 is selected, the display 3110 may be set for searching for various content. A search box 3112 may be provided for entering various text from a keypad or the like on the mobile device. A search qualifier such as a title box 3114, a channel name 3116 and a channel number 3118 may also be set forth. Thus, a search identifier may be provided as well as a qualifier such as a title, channel name or channel number. The title or portions of titles may be searched for using the terms entered in the search box 3112. The channel name or partial channel name may also be searched in 3116. A channel number or partial channel number may also be searched.

Figure 32:
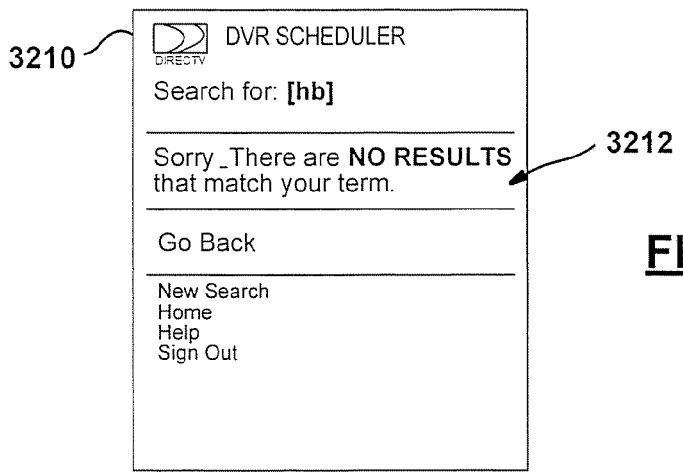
FIG. 32 is a screen display for search results for a particular search item.

Referring now to FIG. 32, a screen display 3210 is illustrated when "hb" was searched for using the channel name or channel number. Various types of messages 3212 such as that of 3210 may be provided if no results are found.

Figure 33:
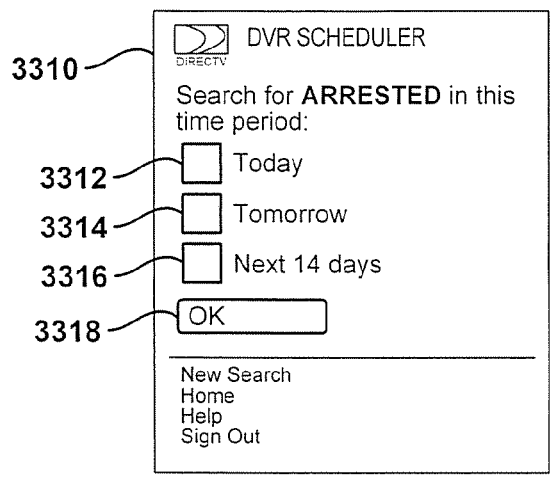
FIG. 33 is a screen display for performing a search with time constraints.

Referring now to FIG. 33, as illustrated in screen display 3310, after entering a search term such as "arrested" in the search box 3112 of FIG. 31, time qualifiers may be entered. The searching may also be qualified by time qualifiers such as a today box 3312, a tomorrow box 3314, or a next 14-day box 3316. By selecting one of the boxes, 3312-3316, the search term may be searched for only a limited period. Once the time qualifier has been selected in the "ok" box, 3318 may be selected to proceed with the searching.

Figure 34:
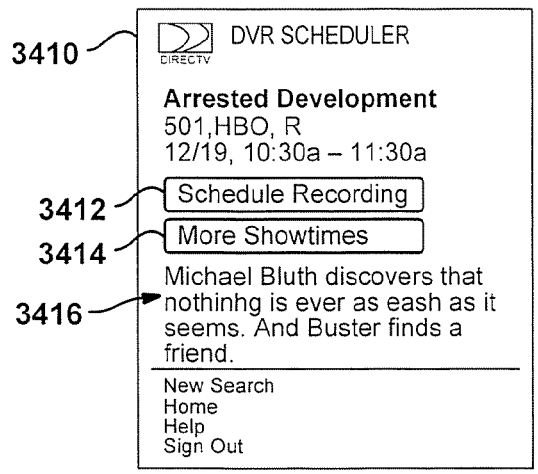
FIG. 34 is a screen display of search results returned from a search.

The results provided from doing a word search may be provided in a tabular form or if only one result is provided, a detailed display 3410 such as that illustrated in FIG. 34. If "Arrested Development" is the particular title, a recording may be scheduled by selecting the schedule recording box 3412 for illustrating more show times by selecting box 3414. Oftentimes, a particular show has various show times associated therewith. Thus, another show time may be selected for recording. A brief description 3416 may also be provided in the system describing the particular content. During the search, it should be noted that both on-demand and linear programming may be searched.

Figure 35:
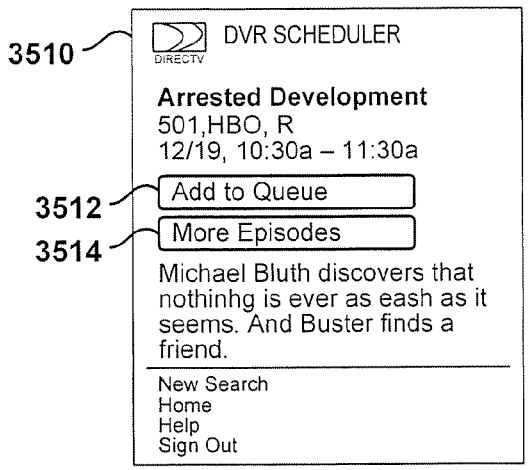
FIG. 35 is a screen display of search results with a pair of selections.

Referring now to FIG. 35, an alternative screen display 3510 may be set for when "arrested" was searched. An "add-to-queue" box 3512 may be used to add the particular show to the user's queue. A "more episodes" box 3514 may also be provided so that more episodes of a particular program may be set forth.

Figure 36:
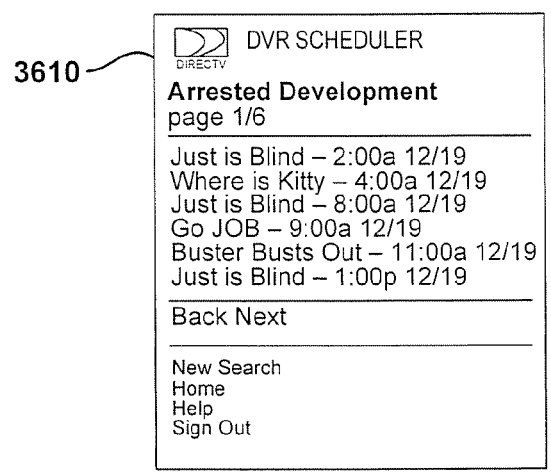
FIG. 36 is a screen search display illustrating further episodes of a search.

Referring now to FIG. 36, a screen display 3610 illustrates various episodes that may be provided by selecting the "more episodes" box 3514 of FIG. 35. By selecting the "more episodes" box, various episodes of the same program may be set forth so that they may be selected by a user.

Figure 37:
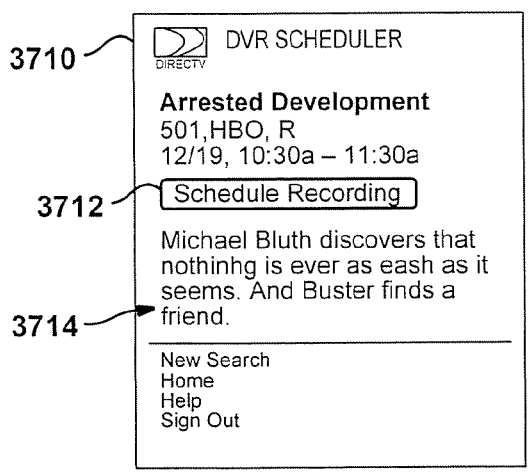
FIG. 37 is a screen display for scheduling recording of search results.

Referring now to FIG. 37, a display 3710 is illustrated for providing one option in response to a search. No other episodes or programming related to the particular search has been provided. Only a schedule recording box 3712 may be provided along with various information 3714 regarding a particular program.

Figure 38:
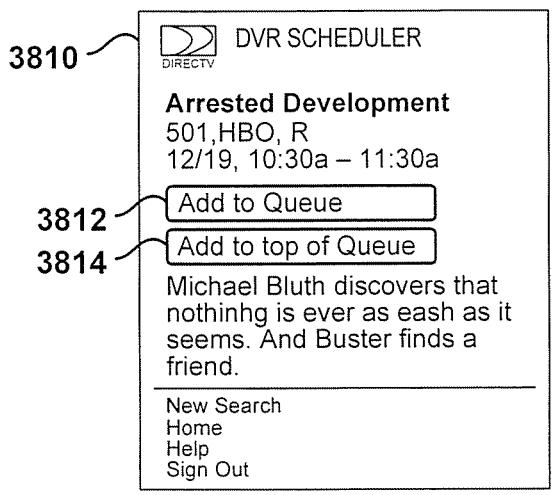
FIG. 38 is a screen display of search results with queue selections.

Referring now to FIG. 38, an alternate display 3810 may also be formed when a particular title is searched. When title is found, an add-to queue box 3812 may be displayed on the user interface. An add-to the top of the queue box 3814 may also be provided. When the add-to the queue box 3812 is performed, recording priority may be set and communicated to add the program to the bottom of the queue. The add-to the top of the queue box 3814 will be used to add to the top of the queue. The selection may be communicated to the content processing system to add to the particular user's queue.

Figure 39:
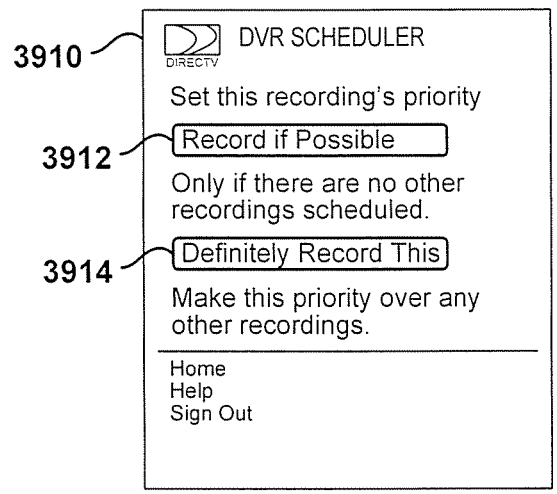
FIG. 39 is a screen display for selecting recording types.

Referring now to FIG. 39, a screen display 3910 used to set the priority is illustrated. Display 3912 may correspond to the add-to the top of the queue selection 3814 or may be an independent display after the desirability of recording is selected. A record-if-possible box 3912 and a definitely-record-this box 3914 may be provided in the display 3910. The record-if-possible box, when selected, may initiate a recording request that records only if other recordings are not scheduled. The definitely record this box 3914 may be selected to have priority over recordings even a recording is currently being performed. If recording is currently being performed, the recording may be paused and permanently eliminated or ended or may be resumed after the selected recording is performed.

Figure 40:
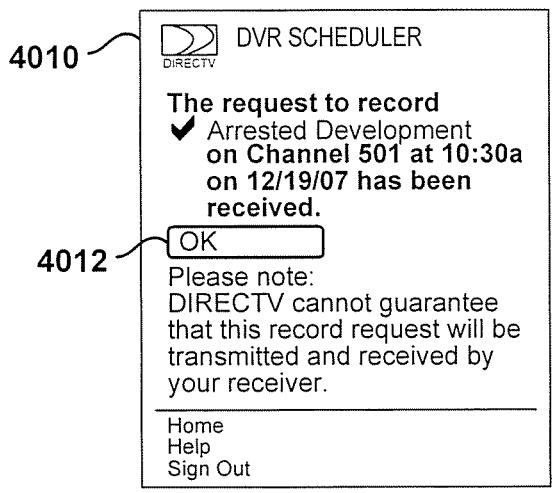
FIG. 40 is a screen display for confirming a request.

Referring now to FIG. 40, a screen display 4010 illustrates a confirmation request to record a particular title such as "arrested development" on a channel and then a specific time on a specific date. An "ok button" 4012 may be used to confirm the quest and send a confirmation signal to the content processing system.

Figure 41:
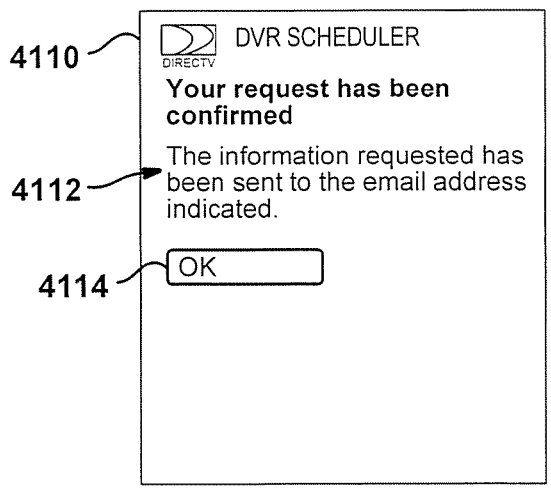
FIG. 41 is a screen display confirming a recording request.

Referring now to FIG. 41, a screen display 4110 illustrating that a request has been confirmed is illustrated. The request may indicate in text 4112 that an e-mail has been sent to the e-mail associated with the account. The request may be confirmed in response to selecting the ok box 4012 of FIG. 40. An "ok" box 4114 may also be provided on the display 4110 to continue with the process.

Figure 42:
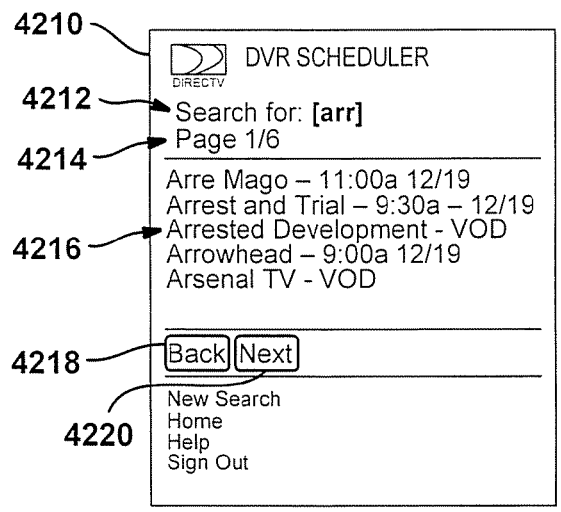
FIG. 42 is a screen display illustrating search results for searching a search string within a title.

Referring now to FIG. 42, a screen display 4210 illustrating a search for a particular phrase such as "arr" is illustrated. A search term indicated 4212 may be set forth along with the number of pages and the particular page in a page indicator 4214. Various titles associated with the word search may be illustrated at 4216. Navigation buttons such as 4218 and 4220 may be provided. Navigation button 4218 provides a back function to scroll backwards in pages. Button 4220 illustrates a next button for navigating forward in various buttons.

Figure 43:
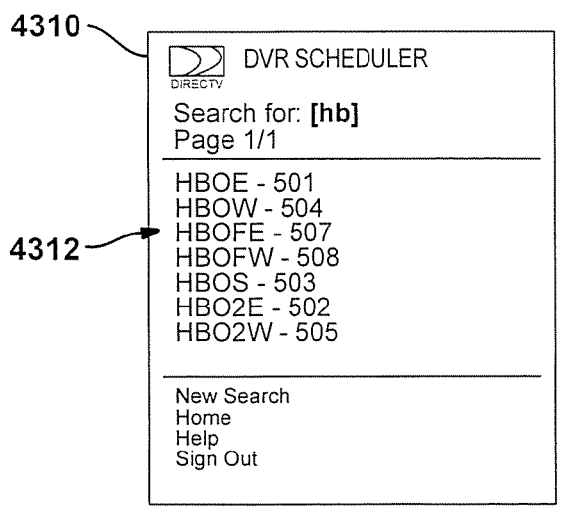
FIG. 43 is a screen display illustrating search results for a channel search.

Referring now to FIG. 43, a screen display 4310 is illustrated for a search in the channel searching area for "hb". As is illustrated, a channel listing 4312 has been provided for the channels associated with hb. There are several Home Box Office® channels displayed. From this, a selection may be made to a particular channel and a particular time period to search within. Searching may take place in a particular time window such as that illustrated in FIG. 33 above.

Figure 44:
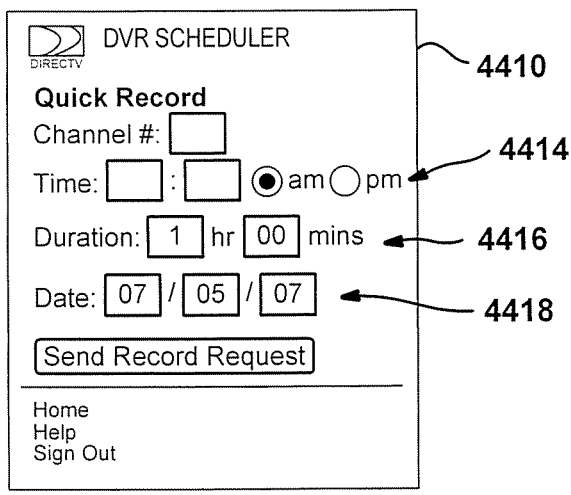
FIG. 44 is a screen display illustrating a quick recording for a DVR scheduler.

Referring now to FIG. 44, a quick record screen display 4410 is illustrated. The quick record screen display may be displayed after the quick record button 3014 illustrated in FIG. 30 is selected. The quick record display may include a channel box 4412, a time box or boxes 4414, a duration time 4416 and a date box or boxes 4418. The channel number may be inserted by the user of the mobile device in the channel box 4412. The time may be pre-filled in the time boxes 4414. A pre-filled time or another time may be input over the time in boxes 4414.

The duration boxes 4416 may include an hour and a minute time. The date boxes may include day, dates and year.

Figure 45:
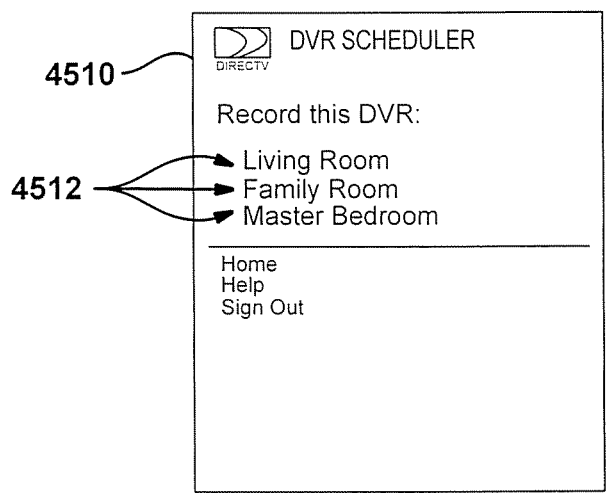
FIG. 45 is a screen display for selecting a recording device associated with the account.

Referring now to FIG. 45, a display 4510 illustrating a plurality of user devices associated with the account is illustrated. This step is optional and thus downloading may be performed to only one of the devices associated with an account. However, various numbers of set top boxes are associated with an account. A selection may be made for the particular set top box or device to which the content should be stored.

Display 4510 includes lines 4512 that correspond to different set top boxes. In this example, a living room, a family room and a master bedroom are illustrated as the selection. By moving a cursor or the like within the user interface of the display 4510, a selection may be made with the mobile device.

Figure 46:
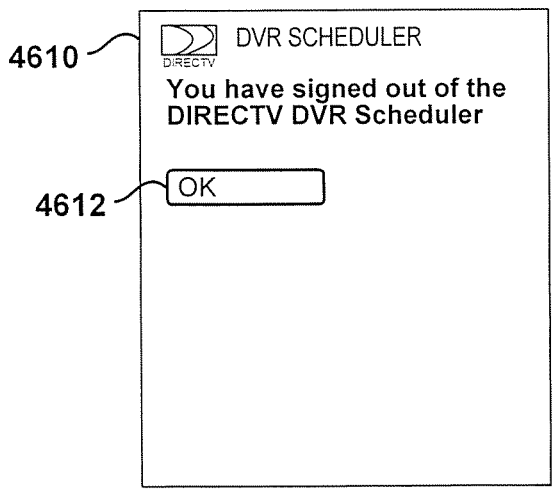
FIG. 46 is a screen display illustrating logging out of the DVR scheduler system.

Referring now to FIG. 46, once the user has selected a device the user may sign out of the website. A display 4610 may be used to indicate that the user has signed out of the system. In this example, "you have signed out of the DirecTV DVR scheduler" is set forth. This is intent of the user, an "ok box" 4612 may be selected to end the connection to the service.

Figure 47:
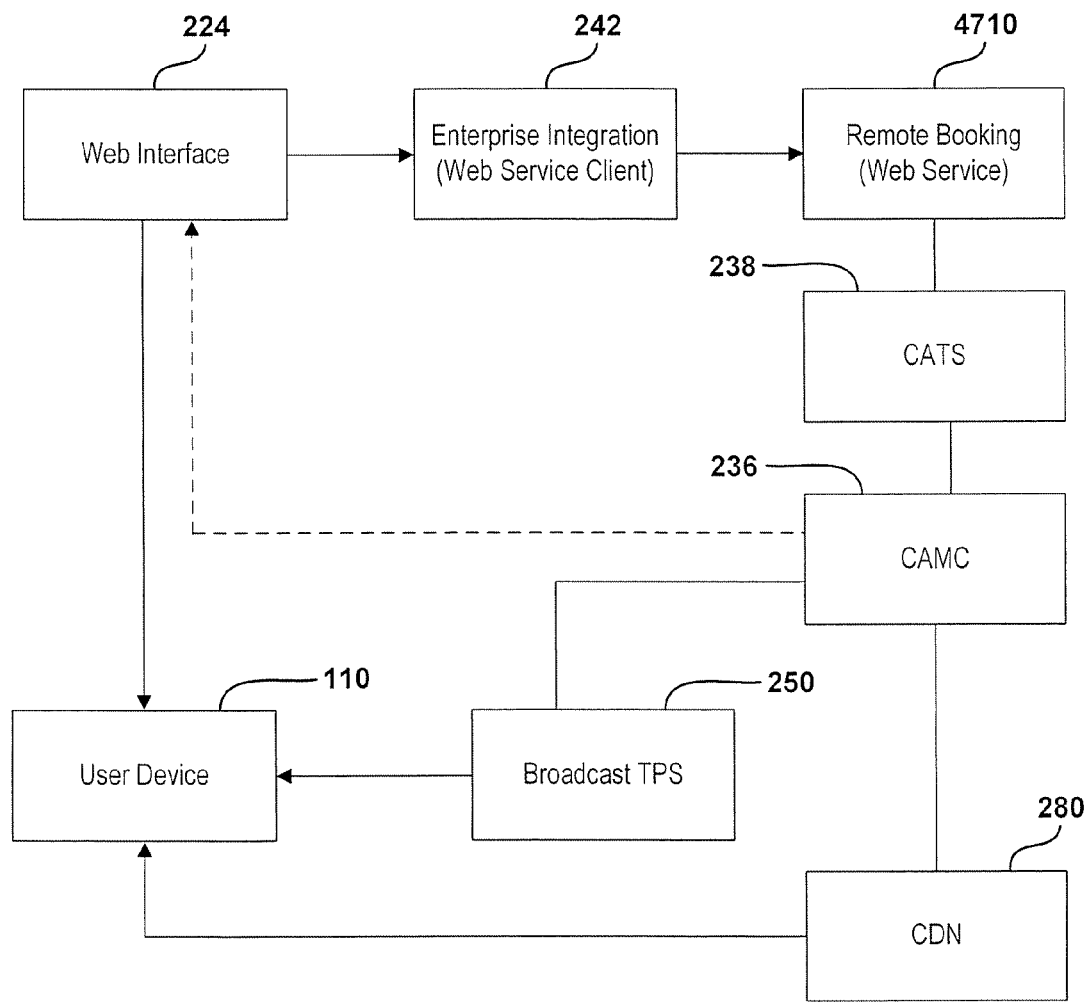
FIG. 47 is simplified block diagrammatic view of a secure ordering system.

Referring now to FIG. 47, a simplified block diagrammatic view of the content processing system 102 is illustrated. The same reference numerals are used for the same components illustrated in FIG. 2. In this embodiment, the web interface 224 is in communication with the enterprise integration system 242. The enterprise integration system 242 may include or be regarded as a web service client as will be described below. The enterprise integration module 242 is in communication with the remote booking web service 4710. The remote booking web service 4710 is in communication with a conditional access management center 236 through the conditional access transaction system 238. The conditional access management center 236 is in communication with a broadcast TPS 250 that is used to broadcast signals through a satellite and a content delivery network 280 that communicates content through a network to the user device 110. The user device 110 may also be in communication with the web interface 224 as will be described below.

In general, broadband video titles or on-demand titles and linear titles may be requested for download by a device such as a mobile device as described above or at an interface such as the web interface 224. A conditional access packet (CAP) is created by the CAMC 236 to instruct a set top box or other type of user device 110 to perform an action such as recording particular content. The request may come from a device capable of using a web service. The requests are routed through the enterprise integration module 242 which in turn communicates with a remote booking web service 4710. The conditional access transaction system 238 generates a CAP and provides it to the user device 110 through the conditional access management center 236. A response may be generated as to the success or failure of information.

In the above example, internal and external devices may be used as the web service. For example, Directv.com or a third party may be used.

Figure 48:
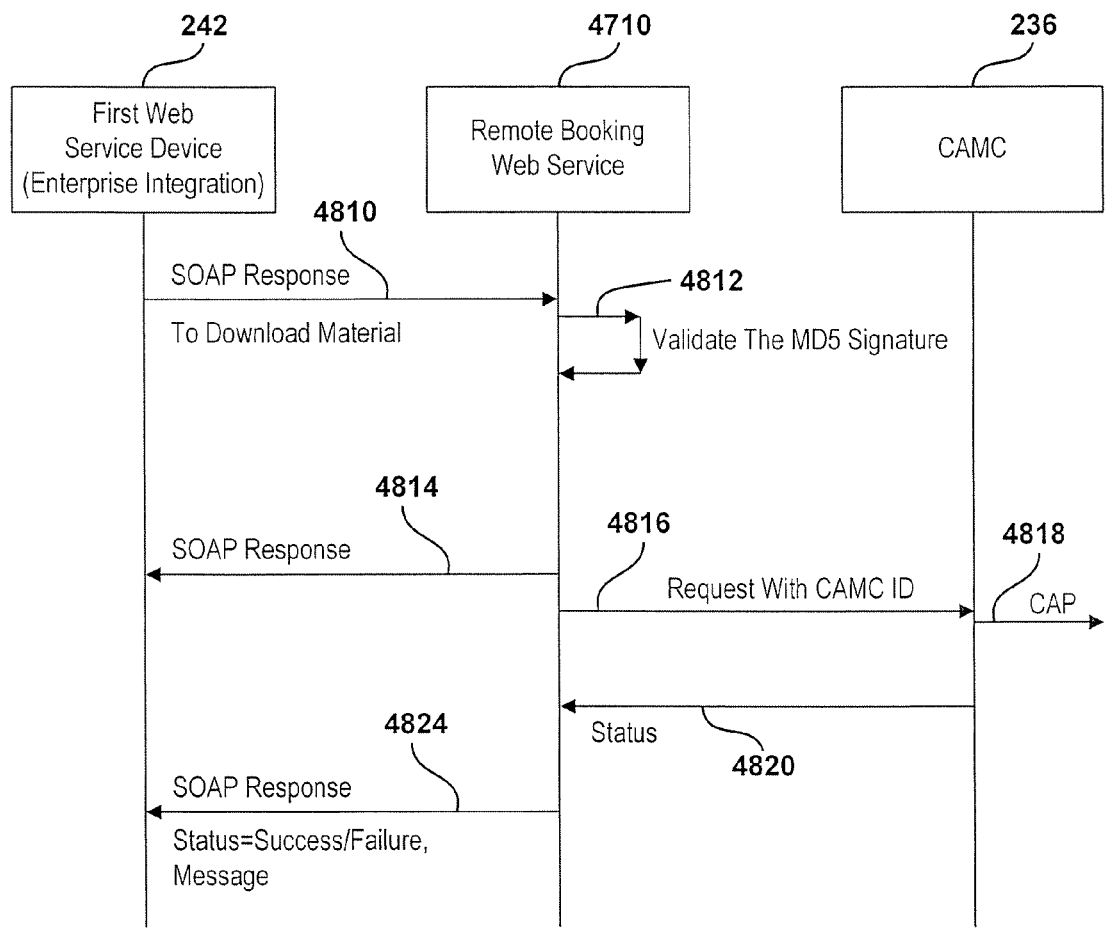
FIG. 48 is a sequence chart illustrating a process for operating the secure ordering system.

Referring now to FIG. 48, a first web services client, such as the enterprise integration module 242 of FIGS. 2 and 47, is illustrated. A remote booking web service 4710 is also illustrated in addition to the conditional access management center 236. The sequence diagram of FIG. 48 illustrates the sequence to provide security between the various devices. The first web service client may be located within the enterprise integration block 242. This may also be a standalone component. Likewise, the remote booking web service 4710 may be physically part of various components illustrated in FIGS. 2 and 47.

Prior to the process in FIG. 48, Directv.com calls the enterprise integration block or first web service. The second web service is called from the first web service. This is performed in step 4810 which is illustrated as a SOAP message to download material. In the following SOAP is used. SOAP refers to a service-oriented architecture protocol. However, other types of protocols may be used. The SOAP message may be referred to as a first message and may include a first security portion or value. The security value may include various types of information including conditional access module identification. The conditional access module card identification may correspond to a conditional access card at a particular user device. This may be used to provide security measures. The first security value may also include a time stamp that denotes the time of creation of the request. The time may be represented in various forms in coordinated universe time (UTC).

The first security value may also include a service such as the remote booking web service 4710 and a method such as remote booking.

The first security value may also include an MD5 signature. MD5 refers to message digest algorithm 5 formatting. A symmetric key may be used to produce the signature. The symmetric secret key may be distributed by an operations group operating the content processing system. The data for the signature may include all or some of the portions of the security value described above. For example, the CAM ID, the timestamp, the service and method may be used together or partially.

In step 4812, the remote booking web service validates the signature. The signature may be validated by calculating a new signature using the secret key and verifying that the received signature and the calculated signature are the same.

A SOAP response signed is generated in step 4814. The SOAP response may generate a response indicative that the signature is not valid and thus the request will not be processed. An identification of a valid request may also be generated in the SOAP response in step 4814. An invalid response may also indicate that a duplicate message such as that illustrated as reference numeral 4810 has been submitted.

Once validated, a request is communicated between the remote booking web service 4710 and the conditional access management center 236. This may include interaction with the conditional access transaction system 238 illustrated in FIGS. 2 and 47. The request in step 4816 may include a header or other identifier that includes information derived from the message 4810. The message may include the service type, the method performed, the time stamp, a transaction identifier and the CAMC identifier for the CAM card of the user device.

In response to the request from the remote booking web service, the CAMC 236 generates a CAP (conditional access packet) or control word in step 4818. The conditional access packet may include various types of information including the manufacturer identification that uniquely identifies each set top box. A command code may also be provided within the CAP. The command code may identify a command type. For example, remote recording may be a specific code. The code may be various numbers of bits depending on the various types of functions provided.

The remote booking web service may also provide a serial number to the CAMC 236. The serial number may be an unsigned 32 bit value that increments sequentially for each remote recording request sent across the population of all requests being issued. The requests may have various numbers of bits and may wrap around to zero when the counter has been exhausted.

The CAP may also include a method type specifying the method for which the material may be downloaded. The method type may include various numbers of bits. A method type corresponding to a remote recording using a material ID may be one method, while remote recording using a content identifier may be another method. Yet another method is remote recording using channel-time-duration and remote recording using a content reference identifier (CRID). Various other types of recording may be provided.

The CAP may also specify a date and time that the request expires. This may consist of a 32 bit value that represents the number of seconds elapsed since a particular date such as Jan. 1, 1970, coordinated universal time (UTC). A priority may also be assigned to a bit or number of bits within the CAP. A priority may be assigned to each recording. A normal priority status may mean the recording will follow a normal recording schedule built into the receiver conflict resolution logic. A high priority means that the recording may override anything else scheduled by the user, but not system-operator mandatory use of the receiver's resources. The resolution between multiple and competing uses of high priority remote recording CAP against the receiver's finite resources may be determined by comparing the serial numbers of the CAP. The lower serial number may have priority over higher serial numbers until the receiver's resources are fully utilized.

A verify caller bit or bits may also be included in the CAP. This may correspond to providing an identifier for reporting back progress of scheduling and receiving the requested recording. The verify callback bit may be used to initiate an email from the content processing system 102 as described above.

A material ID that uniquely identifies the material that is being requested for download to the user device or set top box is set forth. The material ID may be a 12-byte ASCII. A series string indicator may also be provided that identifies whether a single episode or a series of episodes may be downloaded.

The system may also be used to communicate content from both a satellite source and a broadband source. A satellite source allowed bit and a broadband source allowed bit may also be provided. A channel constraint bit may also be provided that allows the system to ignore the satellite source allowed bit and the broadband source allowed bit. For duration recordings, a duration field may also be provided in the CAP. The channel number for the TV URL may also be provided in the CAP. The duration and length may be used to identify the time duration channel configuration. A major channel field and a minor channel field may also be provided.

If a CRID is used in the recording, the CRID length or the CRID characters may also be provided in the CAP. The CRID field is a variable length ASCII text string that consists of a service name used in the program guide transmission.

After the CAP is transmitted, a status signal may be generated by the CAMC 236 and communicated to the remote booking web service 4710. In response to the status, a SOAP response signal may be generated in step 4824. The SOAP response may generate a success or failure message corresponding to the status signal 4820.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of ordering content comprising:

accessing an ordering interactive interface from a first device, said ordering interactive interface comprising a search screen selector box and a quick record selector box, after selecting the quick record selector box, initiating a quick record function having a menu in the ordering interactive interface comprising a plurality of text entry boxes including a time box with a time value, a duration box with a duration value and a date box with a date value, and pre-filling the time box with a current time, the duration box with a preset duration and the date box with a current date;

after selecting the search screen selector box, entering a search term in the search screen selector box from a user interface of the first device, communicating a search term to a content processing system, searching program data at the content processing system, displaying content based on said searching, and selecting content to form a content selection;

forming a recording command comprising: a) a linear channel, the time value, the duration value and the date value; or b) the content selection;

communicating a customer identifier and the recording command from the first device to the content processing system;

forming a control word based on the customer identifier and the recording command at the content processing system;

communicating the control word from the content processing system to a user device that is different than the first device; and receiving the content corresponding to the recording command at the user device in response to the control word.

2. A method as recited in claim 1 further comprising in response to communicating the control word, sending an email indicating the control word was sent to the user device.

3. A method as recited in claim 1 wherein after receiving, storing the content in a memory of the user device.

4. A method as recited in claim 1 wherein accessing the ordering interactive interface comprises entering the customer identifier and password.

5. A method as recited in claim 1 wherein forming a recording command comprises forming the recording command from a menu on a mobile device.

6. A method as recited in claim 1 wherein forming the recording command comprises forming the recording command from the menu.

7. A method as recited in claim 1 wherein forming the recording command comprises pre-filling the menu with a linear channel in a channel box.

8. A method as recited in claim 1 wherein communicating the control word comprises communicating the control word through a satellite.

9. A method as recited in claim 1 wherein communicating the control word comprises communicating the control word through a broadband communication system.

10. A method as recited in claim 1 wherein communicating the control word comprises communicating the control word through a terrestrial system.

11. A method as recited in claim 1 wherein receiving the content comprises receiving the content through a satellite.

12. A method as recited in claim 1 wherein receiving the content comprises receiving the content through a broadband communication system.

13. A method as recited in claim 1 wherein receiving the content comprises receiving the content through a terrestrial system.

14. A method as recited in claim 1 wherein communicating the control word comprises communicating the control word through a satellite and wherein receiving the content comprises receiving the content through a satellite.

15. A method as recited in claim 1 wherein communicating a control word comprises communicating the control word through a satellite and wherein receiving the content comprises receiving the content through a broadband communication system.

16. A method as recited in claim 1 wherein the user device comprises a satellite television set top box.

17. A system comprising:

a first device having an ordering interactive interface, said ordering interactive interface comprising a search screen selector box and a quick record selector box, after selecting the quick record selector box with a quick record function with a menu comprising a plurality of text boxes including a time value prefilled with a current time, a duration value prefilled with a preset time duration and a date value prefilled with a current date;

after selecting the search screen selector box, entering a search term in the search screen selector box from a user interface of the first device, communicating the search term to a content processing system, searching program data at the content processing system, displaying content based on said searching, and selecting content to form a content selection;

said first device forming a recording command comprising: a) a linear channel, the time value, the duration value and the date value; or b) the content selection;

said first device communicating a customer identifier and the recording command to the content processing system said content processing system forming a control word based on the customer identifier and the recording command and communicating the control word to a user device that is different than the first device; and said user device receiving the content corresponding to the recording command in response to the control word.

18. A system as recited in claim 17 wherein the content comprises linear content.

19. A system as recited in claim 17 further comprising a satellite in communication with the content processing system communicating the control word therethrough.

20. A system as recited in claim 17 further comprising a broadband communication system communication with the content processing system communicating the control word therethrough.

21. A system as recited in claim 17 wherein the user device comprises a satellite television set top box and the first device comprises a mobile device.

* * * * *